SIGNAL RESPONSIVE APPARATUS

Filed Oct. 5, 1965 6 Sheets-Sheet 1

INSTRUCTION FORMAT

INTERNAL FUNCTION REGISTER

INVENTORS
JAMES P. ASHBAUGH
JAMES C. BORGSTROM
THOMAS C. TOLLEFSON

BY Charles A. Johnson
ATTORNEY

MEMORY BLOCKS = $400_8$ (ADDRESSED $000_8 - 377_8$)
EACH MEMORY BLOCK HAS $1{,}000_8$ ADDRESSABLE REGISTERS
TOTAL SYSTEM HAS $400{,}000_8$ ADDRESSES (MAX.)
MODULES = 4, EACH MODULE HAVING 100,000 ADDRESSES (MAX.)

SIGNAL RESPONSIVE APPARATUS

Filed Oct. 5, 1965 6 Sheets-Sheet 4

United States Patent Office 3,389,380

Patented June 18, 1968

3,389,380

SIGNAL RESPONSIVE APPARATUS

James P. Ashbaugh, James C. Borgstrom, and Thomas C. Tollefson, St. Paul, Minn., assignors to Sperry Rand Corporation, New York, N.Y., a corporation of Delaware Filed Oct. 5, 1965, Ser. No. 493,180
20 Claims. (Cl. 340—172.5)

ABSTRACT OF THE DISCLOSURE

The subject invention relates to an addressing control system. The system finds particular application when two independent memory modules are available, but it is not limited thereto. The system provides for utilizing instructions in a program coded in a relative address format, and further provides for a separate bank or portion of memory for the storage of operands and the like having a separate relative addressing relationship. As the addresses are called out in the operating program, the system operates to compute in parallel a pair of alternative absolute addresses and then operates to select the appropriate absolute address for accessing memory.

Figure 1:
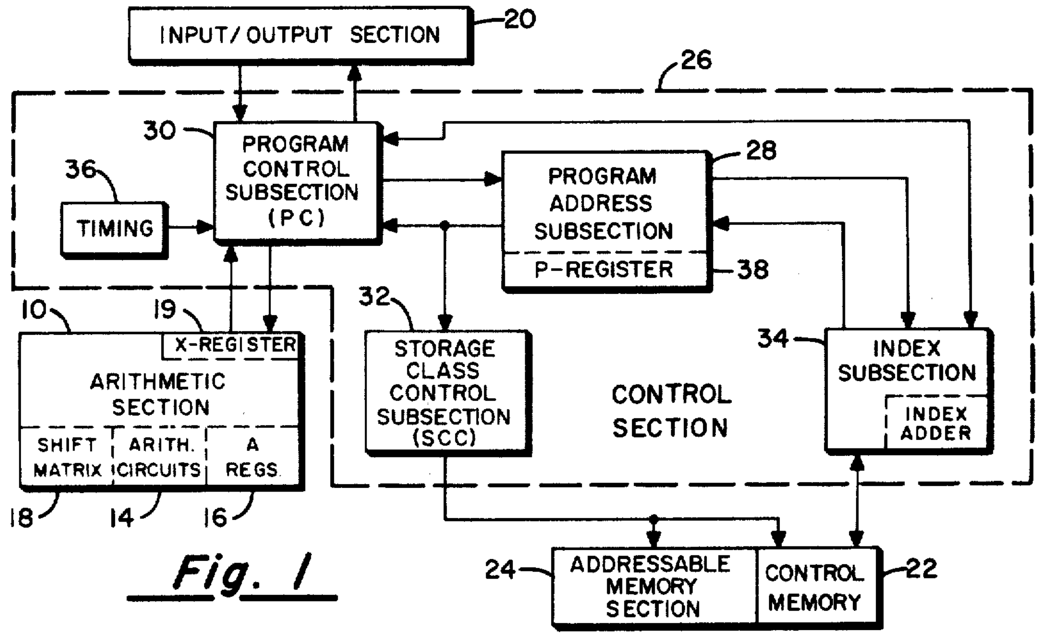

This invention relates to apparatus and methods for controlling the operation of a digital computer, and it has particular reference to apparatus for calculating an absolute memory address from a programmed relative address and for selecting a portion of the memory to be accessed.

In internally programmed automatic computers, a storage medium is ordinarily employed as an internal memory for storing operands, and for storing commands. Operands are normally data which is to be operated upon, and the commands collectively are programs to be carried out automatically by the computer. It is common practice in many digital computers of the present day to provide a predetermined repertoire of instructions. That is, a predetermined operational capability is defined each of the individual commands operating to perform a specific designated function. It is also common in a total instruction word to include in addition to the command portion, an address portion which designates an addressable location in the memory section. Additionally, for those machines which include indexing capabilities, commonly referred to as "B-boxing," and other similarly well-known control functions, the instruction word contains signal representations indicative of these various control functions. The command portion of the instruction indicates the operation which is to be performed by the computer, and the address portion of the command indicates the address in the storage medium in numerical information upon which the operation is to be performed. The address portion may also indicate the address in the storage medium in which an intermediate result or the answer is to be stored. For branching instructions, the address portion may also designate the address in memory to which the sequence of instructions is to proceed. Storage medium such as magnetic core storage, magnetic drum storage, or magnetic disc file storage is normally divided into addressable storage locations These are accessable by presenting an address comprised of a plurality of signals indicative of the address number to the address translation circuitry whereby access to the desired storage location is made.

In order to solve a particular problem with a digital computer, it is standard to form a predetermined listing of computer instruction words and to store these instructions in the memory section of the computer in a sequentially addressable manner. It is also common after the sequence of instructions are determined, to store the data words, such as constants to be used in calculation or other data that is to be manipulated by the program, at the end of the stored program. With the advent of computers that operate at higher and higher computational rates and have much expanded computational capacity, it becomes desirable to provide a plurality of independently operable programs in the memory section and to provide a control program which will cause a particular selected worker program to be processed until such time as it is either completed or requires access to slow rate peripheral equipment. Following completion, a new program is initiated to be executed by the executive program. In the alternative, when the executive program determines that an undue amount of time will be wasted in waiting for a piece of peripheral equipment to be started up or to complete an operation, it can temporarily interrupt the performance of one of the programs and proceed to execute a portion of another program. In addition to the program stored within the memory section of the computer, it is common practice to have programs available on storage media external to the computer. These programs can be called for execution in the computer when time becomes available. One of the difficulties which seriously limits the application of large scale digital computers in the performance or continuous execution of various independent programs is the fact that when programs are generated they are commonly assigned a predetermined sequence of storage addresses, and the operands or data words which are to be manipulated are normally stored in predetermined sequences of storage locations. This seriously limits the storage space available in the memory section when a new program is to be loaded in the middle of a range of instruction addresses that is being executed. When the next program to be loaded and executed also requires all or a portion of the memory locations in which an operating program is stored, the new program cannot be called in, and valuable time is wasted. It is often found that it would be most convenient to be able to relocate a series of operands or a series of instructions at some other addressable location in the memory to facilitate the entry of another program into the memory. In the past, this has been cumbersome at best, and when large programs are involved, virtually impossible. One solution that has been tried, but which has been most ineffective, is to provide a program which attempts to evaluate the stored instructions and to relocate the entire program at a different series of addressable locations. These programs are generally large in the number of instructions required; hence require a large portion of storage themselves, and are normally very inefficient in the use of computer time. Another existing technique is to carefully avoid in the absolute programming, duplication of address between programs which are anticipated to be stored in the machine simultaneously. This seriously limits the versatility of the computing operation by limiting the programs which can be available in the memory section of the computer at any given time, and is most difficult to achieve.

It is to the foregoing problems that the subject invention is directed. This invention relates to an improved memory addressing control system for use in digital computer and provides for having the sequence of instructions stored separately from the operands or data words. It includes means for determining which of the memory sections is to be accessed by a particular instruction, and eliminates the necessity of having the programs result in the sequence of instructions which are related to an absolute set of memory addresses and at which the operands must be stored. The latter feature is accomplished by utilizing a base relative address system wherein references to the instruction are made relative to a starting base address in the memory where the instructions are to be stored, and the addresses of the operands are made relative to the starting base address at which the operands are stored in the memory. An auxiliary set of registers is provided for storing the base address of the instructions and the base address of the operands and for the designator which indicates the selected memory division point for the program in operation. A dual bank of adders is provided for the calculation of the absolute address to be referenced from the base addresses and the programmed relative address. In summary, the base address constant for the instruction words is added to the base relative address designated in the instruction simultaneously with the base address constant for the data words being added to the same base relative address designated in the instruction. Subsequently, each of these two sums are independently added to the index modification, if any, such that two distinct absolute memory addresses are calculated in parallel. The one of the addresses so calculated which is to be actually utilized as the absolute address in memory is selected by a comparison of the instruction designated base relative address to the indicator which defines the division point of the two memory areas. It can readily be seen that by merely altering the location of the stored instructions in the memory and the location of the stored operands in memory, and by altering the respective base addresses, that programs can be readily moved about within the storage section of the machine, whereby memory fragmentation is effectively eliminated. Further, unused areas of memory for a given set of programs can be virtually eliminated by rearranging the existing programs in the memory section. By utilizing the base relative address in the instruction words, it is not necessary to change the actual program instructions as they are stored. It is only necessary to alter the base addresses. The foregoing system finds particular utilization in computers having dual memory systems which have independent addressing capabilities. In such systems, it is convenient to place instructions in one bank, and operands in the second bank. By alternating memory references back and forth between the banks during the execution of an instruction and the reading of the data words and recording of the data words, material increases in speed of computation can be achieved.

Figure 2:
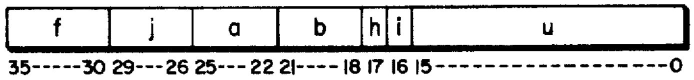
Figure 4:
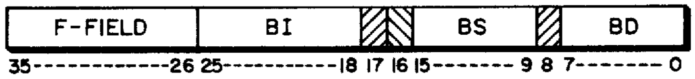
Figure 3:
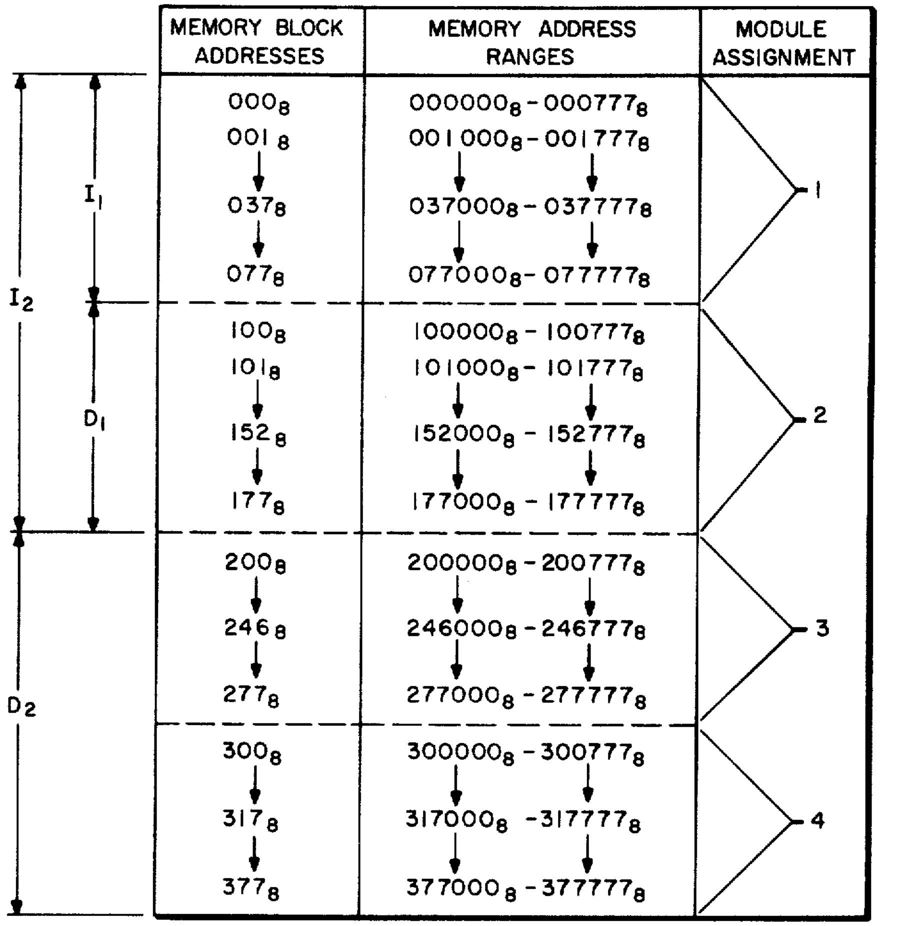
Figure 5:
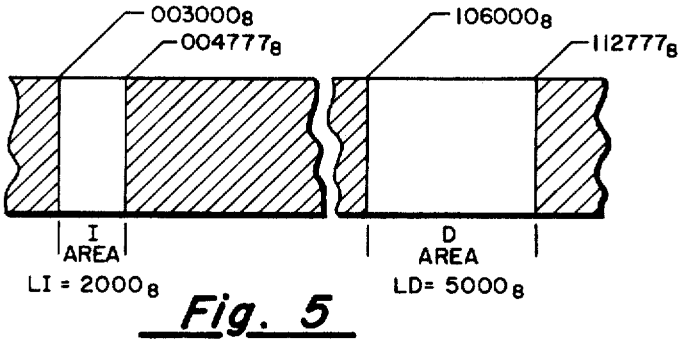
Figures 6, 8:
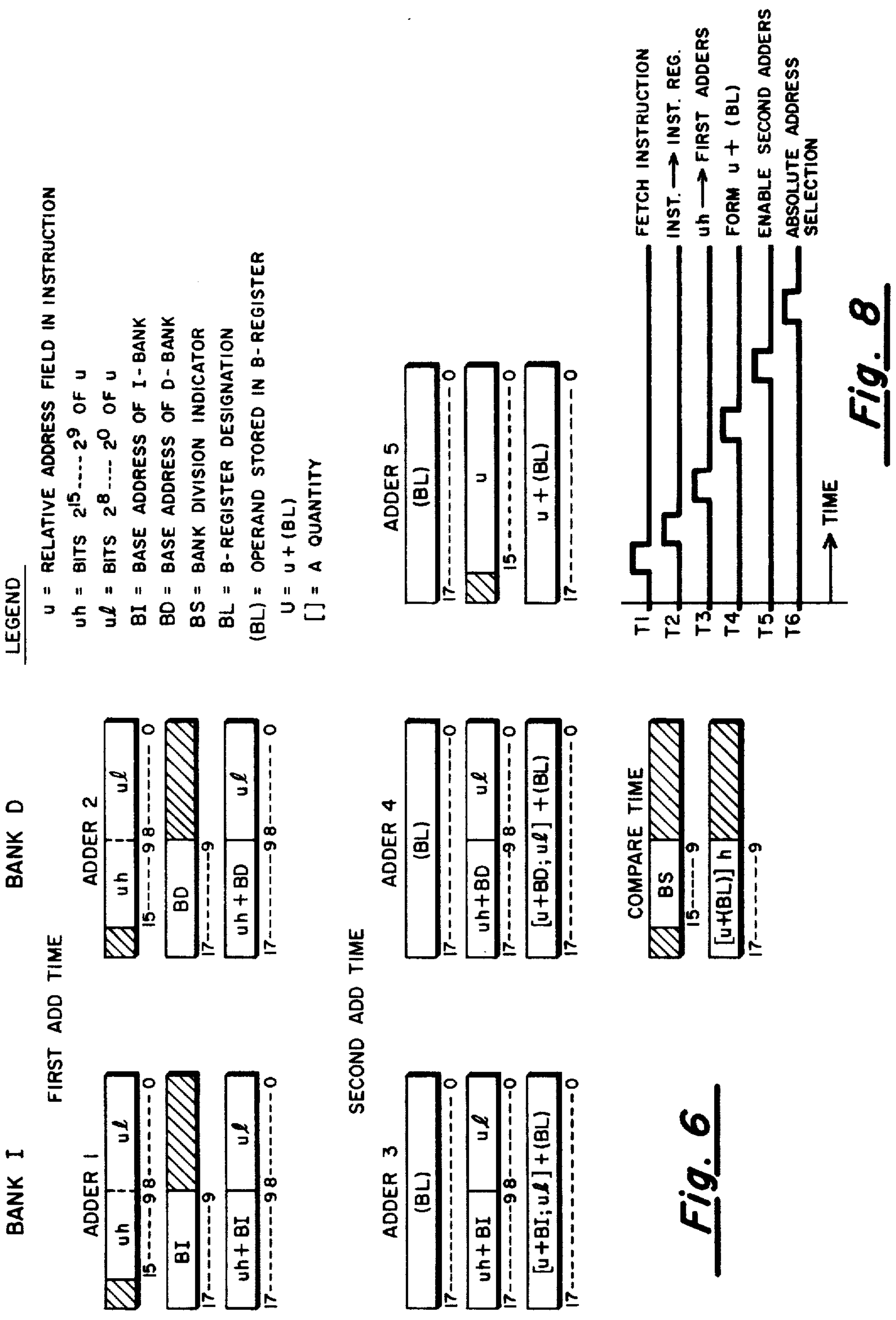
Figure 7:
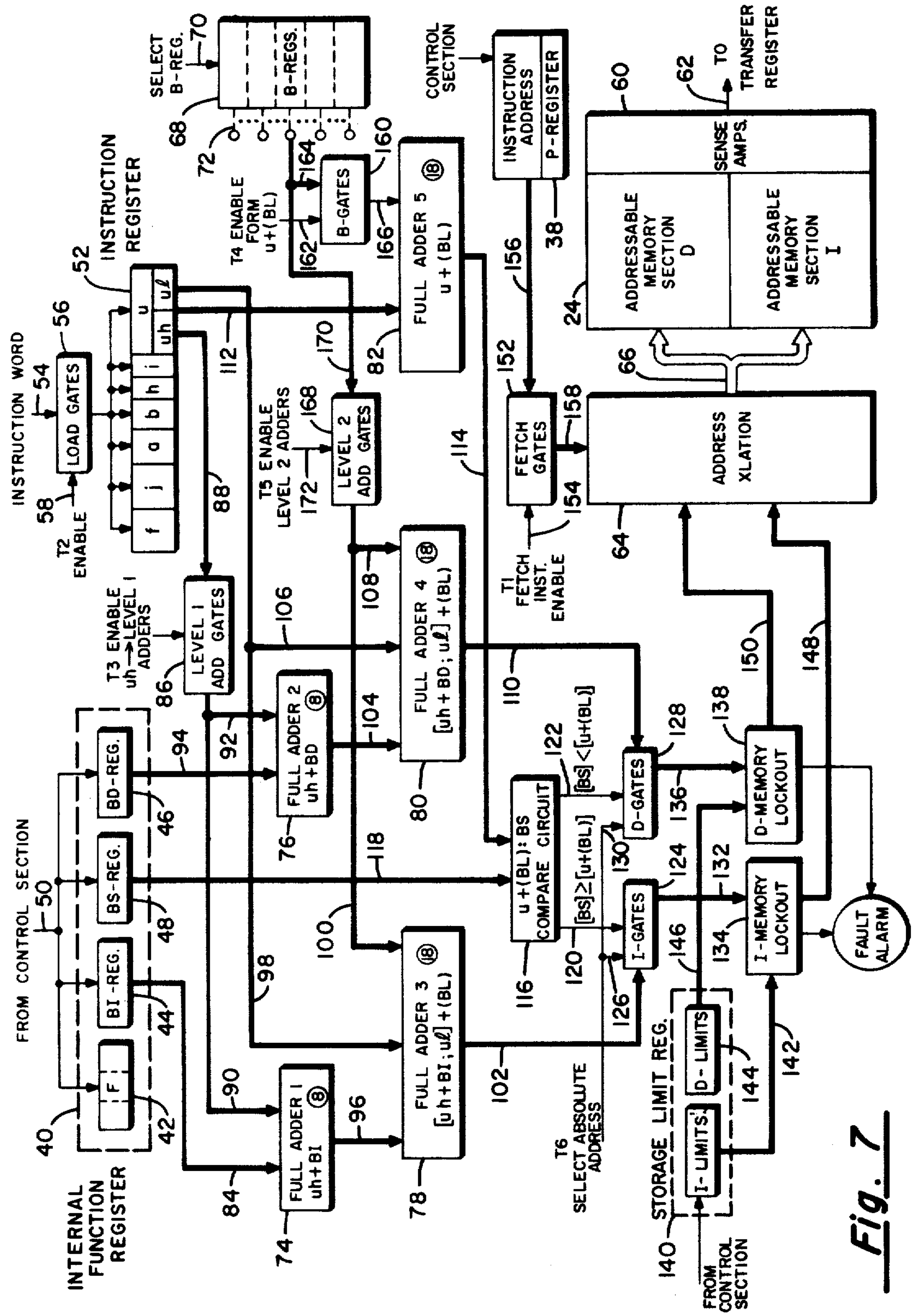
Figure 9:
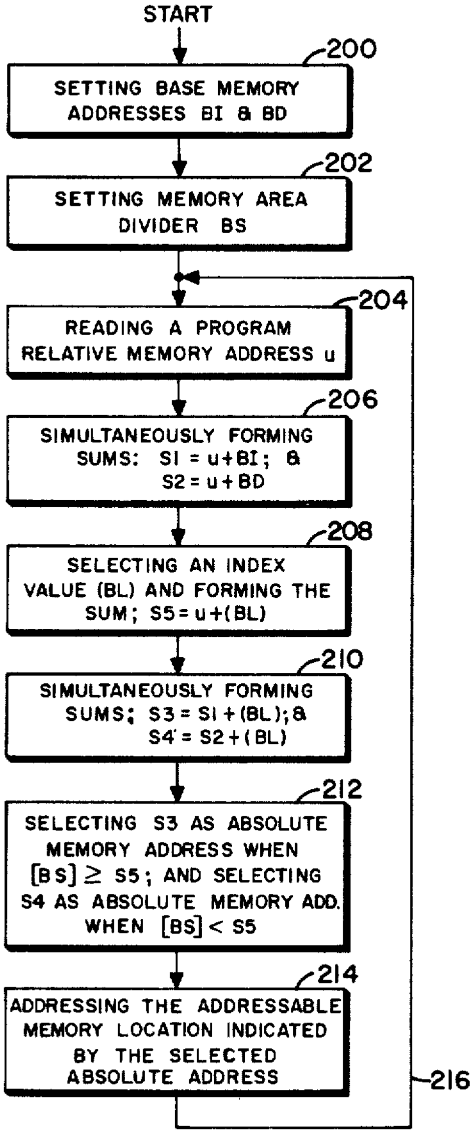
Figure 10:
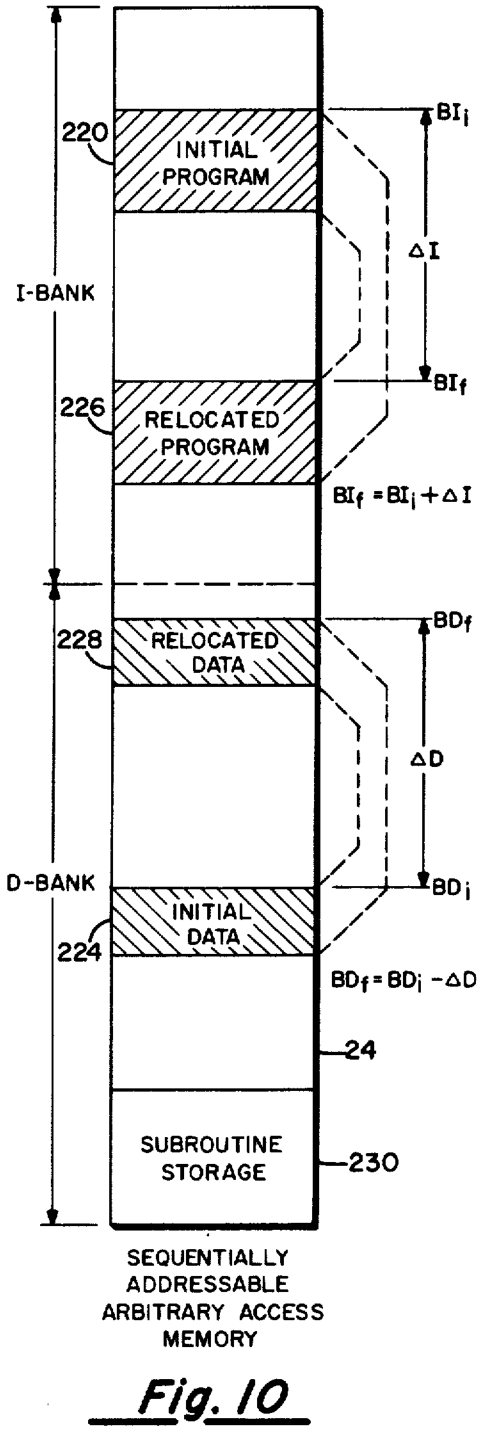
Figure 7A:
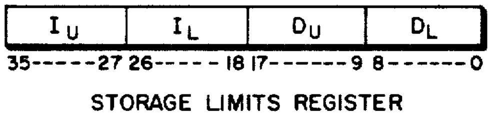
Figure 11:
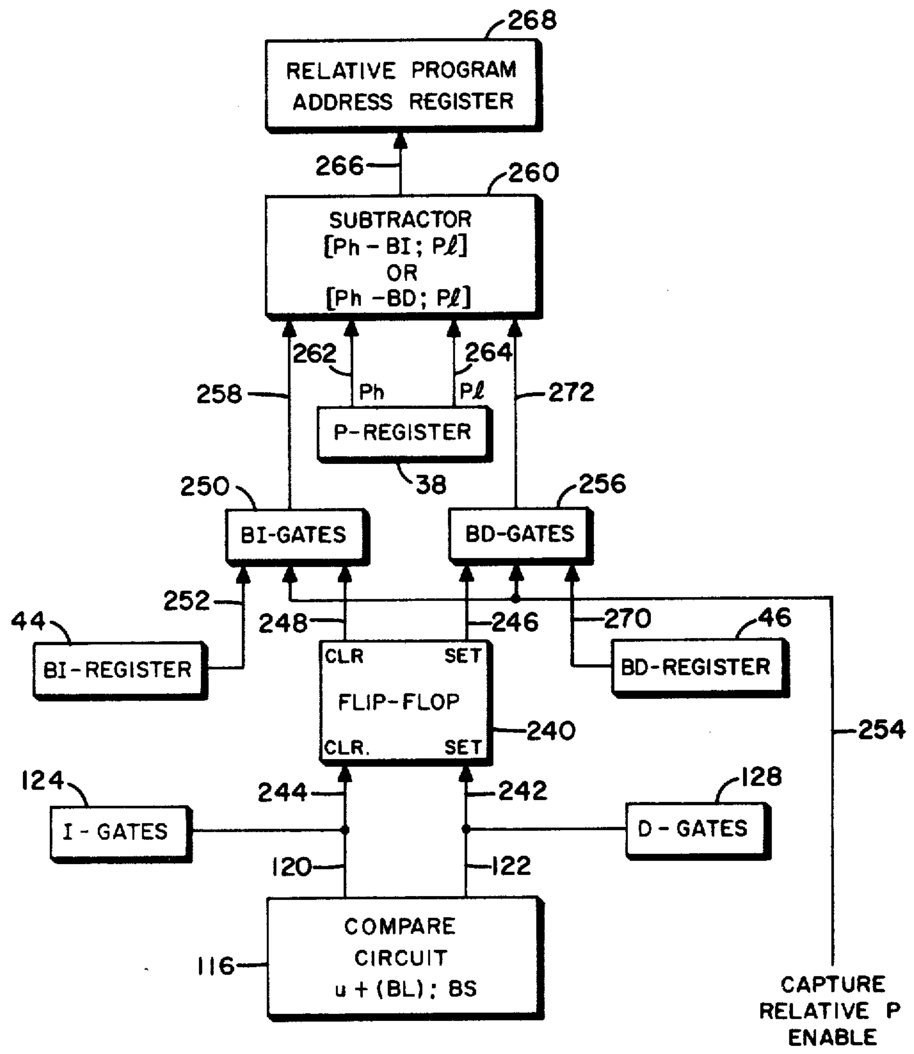

The foregoing aspects of the subject invention are illustrated in detail in the drawings, wherein: FIGURE 1 is a block diagram of a computer utilizing the base relative addressing system of the subject invention; FIGURE 2 illustrates the instruction word format; FIGURE 3 illustrates memory address system; FIGURE 4 illustrates the format of the internal function register; FIGURE 5 illustrates examples of storage arrangements; FIGURE 6 illustrates the quantity additions performed in the calculation of the absolute memory address; FIGURE 7 is a diagram of the addressing circuitry; FIGURE 7*a* shows the format of the storage limits register; FIGURE 8 is a timing diagram of the addressing operation; FIGURE 9 is a process diagram of the addressing system; FIGURE 10 illustrates the program relocation capabilities when the base relative addressing system of the subject invention is utilized; FIGURE 11 is a diagram of the address capturing circuitry.

FIGURE 1 is a generalized block diagram of a computer incorporating the subject invention and illustrates the functional relationship of the various computer components. The lines with arrowheads indicate direction of flow of data or flow of control. The Arithmetic Section 10 does all the actual computations such as addition, subtraction, multiplication, and division. These arithmetic processes can be performed in either the fixed or floating-point computation modes. The Arithmetic Section also performs certain logical functions such as shifting and comparing. In addition to the Arithmetic Circuits 14, the Arithmetic Section 10 includes a plurality of A-Registers, collectively designated 16, to provide intermediate storage for arithmetic operations. The adder which is included in the Arithmetic Circuits 14 is a 36-bit 1's complement subtractive adder (mod $2^{36}-1$). Durin the execution of an arithmetic instruction, temporary internal storage registers (A-Registers 16) within the Arithmetic Section 10 itself are used for the actual computation. The computer first determines that the Arithmetic Section will be used in a given command. Data is transferred automatically from the Program Control Section (to be described below) into one of the X-Registers 19. The data is transferred from the selected X-Register into an internal storage register in the Arithmetic Section, such as one of the A-Registers 16. Once the arithmetic operation has been completed, the results are returned via one of the X-Registers 19 to another one of the *a*-Registers located in Control Memory 22. The X-Registers and the internal storage A-Registers cannot be addressed, and for all practical purposes, the A-Registers 16 are treated as accumulators. The Arithmetic Section has the capability of handling partial words. By appropriate selection in the instruction format, the Arithmetic Section 10 is capable of handling whole words, half-word portions, third-word portions, or sixth-word portions, thereby greatly minimizing the amount of shifting operations or logical masking operations in a given program. The Arithmetic Section 10 also includes a Shift Matrix 18 for completing the shifting of up to twice the operand word length in a single instruction cycle. Since the Arithmetic Section 10 does not form a part of the subject invention, it will not be described in further detail.

The Input/Output section 20 provides the digital computer with the capability of communicating bidirectionally with peripheral units.

The Memory Section of the computer provides data storage facility constantly required by the computer as it performs its computation. The memory comprises two parts, generally known as the Control Memory 22 and the Addressable Memory Section 24, also referred to as Main Memory. The Control Memory 22 is made up of 128 36-bit integrated circuit registers for this embodiment. Each of these registers has a cycle time of 125 nanoseconds. The Main Memory 24 is comprised of high speed toroid ferrite cores whose read/write time is 750 nanoseconds. The Main Memory is arranged with each storage location or register capable of storing 36-bits, and being arbitrarily accessable. For this embodiment, the Main Memory 24 is comprised of two memory banks. By using two independent memory banks, an operating program can overlap the execution of one instruction with the fetching of the next instruction. Because the current instruction need not be fully executed before the next instruction is read, it is often possible to divide the memory cycle time in half, that is reducing the cycle time from 750 to 375 nanoseconds. To take advantage of this capability, the operating program must have the program of instruction words stored in one bank and the data or operands to be operated upon in the other bank. As indicated above, the Control Memory 22 is comprised of a plurality of integrated circuit registers. The Control Memory 22 performs various storage and control functions which are not relative to the subject invention and will not be described in detail. The octal (numerical base 8) addressing of Control Memory is from addresses 00000 to $00200_8$. The operand addressing system of the subject invention does not operate to address the Control Memory 22 in the base relative addressing mode. It should be noted that the base relative addressing system of the subject invention would operate equally well with storage systems such as magnetic drums or magnetic discs.

The Control Section of the computer is shown illustrated within dashed block 26. It is the function of the Control Section to guide and control the entire computer system and provides the control pulses for the proper sequential execution of the stored program. A detailed description of the entire workings of the Control Section 26 would not add appreciably to the understanding of the subject invention; hence, the Control Section 26 will be described generally. The base relative addressing portion of the Control Section will be described in detail below. The Control Section contains four major subsections which are (1) the Program Address Subsection 28; (2) the Program Control Subsection (PC) 30; (3) the Storage Class Control Subsection (SCC) 32; and (4) the Index Subsection 34. The Control Section also includes the circuits which supply the control signals necessary to synchronize execution of the instructions, as indicated by the portion designated Timing and labeled 36. The address of the instruction to be executed is stored in the Program Address Subsection 28. This address is increased by 1 each time an instruction word is processed. This incrementation is accomplished automatically by the index adder which is in the Index Subsection 34. Each instruction word is then transferred in successive order to the Program Control Subsection 30 for decoding and translation. This translation determines the computer operation to be performed. In most instruction words, a *u*-field references an address in memory, such as in Main Memory 24 or the Control Memory 22. The instruction format will be discussed in more detail below. When this designated *u*-field and the address of the next instruction are in the same portion of the addressable Memory Section 24, the next instruction cannot be addressed until the one currently being performed has been fully executed. If, however, they are in different portions of Main Memory 24, the next instruction can be addressed prior to the completion of the present instruction. It is by this operation that the effective computational speed of the computer can be increased. The *u*-field may or may not be modified to form the effective operand address designated as "U," depending upon the instruction word. All transfers from the Program Control Subsection 30 to the storage addressing circuitry are made through the Index Subsection 34 wherein any designated address modification is accomplished. The Program Address Subsection 28 includes a P-Register 38 which stores the address of the next instruction. For this embodiment, the P-Register 38 is an 18-bit register. The contents of the P-Register are increased ($P+1$) at a particular point in each instruction cycle. Thus, the computer has means by which it can initiate and govern the sequential execution of the program instruction word. When the instruction sequence is to be altered by jump or branch instructions, the address which replaces the current contents of the P-Register 38, is the address to which the program control is being transferred. This operation will be described in more detail below in the considering of the capturing of a relative address. As is well-known in the art, there are a large variety of binary registers which can be used for the purpose of storing data words. Preferably each stage of the register is a transistorized bistable flip-flop which provides an output signal indicating the storage state of the stage, that is, whether the stage is in the "0" state or the "1" state. The P-Register 38 and all other registers mentioned herein are contemplated as being of this type or their equivalents. The Storage Class Control Subsection 32 decodes the effective operand address U, of an instruction for subsequent absolute address referencing to the Control Memory 22 or the Main Memory 24. The base relative addressing takes place within the Storage Class Control Subsection 32 and will be described in detail below. Descriptive terms utilized herein will refer to items such as data words, operands, instructions, addresses, and bits. It is understood that these terms are to be used as being equivalent of the signal representations that are actually used in the computing device to indicate these various items. In other words, when referring to the operands being stored in the memory section of the computer, it is understood that each stage in the memory register actually contains a signal representation or a magnetic remanent state indicative of the corresponding digit of the operand. Since only two different signal representations are required for binary numbers, it is common practice to have the signal representations in the form of two different voltage levels, a first level indicating a "1" and a second level being indicative of "0." When numerical examples are presented, decimal numbers will be provided without subscript. When binary or octal numerical representations are set forth, a subscript of 2 or 8 will be utilized, thereby precluding confusion as to what number base is being discussed.

To summarize, the computer illustrated in FIGURE 1 performs all its internal operations in the parallel binary mode. Each computer word and Control Memory 22 and in Main Memory 24 contains 36-bits. These 36-bits may constitute any one of the computer word types, for example, instruction word, data word or constants. The instruction word is divided into parts called designators (to be described below). They specify the function to be performed, the address of the operand, the arithmetic register to be used, the indexing register to be used (if any), incrementing or decrementation of the contents of the index register, and indirect addressing if desired. As the current instruction is being performed, the program address register (P-Register 38) will address and will initiate the translation of the next instruction to be performed. Therefore, it can be seen, that two instruction words can be in operation at any given instant. The instruction or data can be in either the Control Memory 22 or the Main Memory 24 The usual, and the preferred method of operation with this computer, is to have the program instruction in one memory bank and the operands in another memory bank. This is known as so-called "alternate bank operation." The cycle time of the Control Memory 22 is considerably less than the cycle time of the Main Memory 24, and for this embodiment several references of the Control Memory 22 may be made within a single read-write cycle of the Main Memory 24. Input and output operations are done independently of the main program. They are controlled by the I/O access control words stored in the Control Memory 24. The I/O data flow is between the Main Memory 24 and the peripheral equipments (not shown) through the Input/Output Section 20.

FIGURE 2 illustrates the format of the instruction word for the embodiment of the computer which incorporates the subject invention. The instruction word utilizes 36-bits organized into several distinct parts or designators. The various portions and designators will be discussed in order starting from the left and proceeding to the right-most end of the instruction word. The *f*-portion represents the function code or the command operation to be performed by the computer. Illustratively, the *f*-portion may hold the bit combination for dictating that the computer should perform an add operation, a subtract operation, a jump operation, etc. Six-bits are the normal function code configuration; however, for certain operations the *j*-field is also combined as part of the function code. This expands the capacity to distinguish between these specific operations. The *j*-field is 4-bits, and is utilized as the partial-word-transfer designator. In its normal operation the *j*-field determines whether an entire data word or only a specified part of a data word is to be transferred to or from the Arithmetic Section. As previously mentioned, in certain instruction the *j*-field serves as an additional part of the function code designator. When the *j*-field is utilized in its normal function, it specifies which half-word, third word, or sixth word is to be used. When reading from the Memory Section, the transfer is always into the least significant position of the register in the Arithmetic Section will be transferred. Bit positions within tion, the *j*-field specifies to which word, half-word, third word, or sixth word, the least significant portions of the Arithmetic Section will be transferred. Bit portions within the "U" which are not involved in the transfer are not changed. Various combinations of sign extension or lack of sign extension exist in the partial word transfers. For certain conditions of the *j*-field, the *u*-field of the instruction becomes the effective operand rather than the address of the operand as is the normal case. The *a*-field is 4-bits and is termed the A-Register designator. For normal operation, the *a*-field specifies one of sixteen possible A-Registers and in some special cases it can also specify one of the sixteen B-Registers or sixteen R-Registers. Other operations concerned with the *a*-field are not relevant to the subject invention and will not be described. The *b*-field is 4-bits and is used to reference any one of the fifteen index registers that are contained in the integrated circuit registers of the Control Memory 22, when the modification to the *u*-field is specified. The index registers are referred to as B-Registers, and their modification of the *u*-field is often referred to as B-boxing or indexing. When the *b*-field is set to zero, modification of the *u*-field will not take place. If the *b*-designator is coded with a numerical value from $1_8$ through $17_8$ the corresponding B-Register is referenced and its contents are added to the *u*-field to form the effective address "U." This discussion has not taken into account the base relative addressing operation which will describe in more detail below and operates to materially affect the effective absolute address "U." The *h*-field is 1-bit and is termed the incrementation designator. The computer which incorporates the subject invention has the option in each instruction of calling for modification to the B-Register specified by the *b*-field. This modification which takes place after the operation of combining the *u*-field of the contents of the specified index register (B-Register) occurs during the instruction execution at no expense in time. To control alteration of the B-Register modification, the *h*-bit is operative when set to 0 to not increase the lower half of the B-Register, and if *h*- is set equal to 1, to add the upper half of the B-Register to the lower half of the same register and store the sum back in thelower half. The *i*-field is 1-bit and is termed the indirect addressing indicator. The use of indirect addressing permits the entire address field (*u*-field) of the instruction along with the *b*-, *h*-, and *i*-fields to be replaced before the instruction is executed. That is, the effective address "U," is not the address of the operand but is the address of an address. The *i*-field functions such that when it is set to 0, the instruction functions normally, and when set to 1, the lower 22 bits comprised of *b*-, *h*-, and *u*-fields of the instruction are replaced with the lower 22 bits of the contents of the storage register designated in the instruction. This indirect addressing may be continued, or cascaded, to any level during the execution of any one instruction with full indexing capabilities at each level. The indirect addressing will be continued until such time as an instruction word results having the *i*-field equal to 0. The *u*-field is termed the address field, and for this invention, is of the most interest. For most instructions, these 16-bits are used for addressing the memory, either Main Memory 24 or Control Memory 22. Some of the possible instructions of the computer use this field for holding constants or for containing shift counts. It will be recalled that it was specified above that the indexing registers (B-Registers) are comprised of 18-bits. The additive combination of a B-Register of 18-bits and the *u*-field of 16-bits provides adequate address capabilities to directly address a memory having 131,000 independent storage locations. To illustrate the function of the various instruction word designators, assume an arithmetic instruction, stored at the address contained in the P-Register 38 is to be executed. Assume further that the instruction is stored in one portion of Main Memory 24 and that the data is stored in the other portion of Memory 24. Once the arithmetic instruction has been read into the Program Control Subsection 30 the following events take place:

(1) The *f*-, *j*-, and *a*-designators are interpreted by the control circuitry and the appropriate circuitry for performing arithmetic instruction is alerted.

(2) The lower half of the instruction (*h*-, *i*-, and *u*-designators) is transferred from Program Control Subsection 30 to the Index Subsection 34.

(3) The *b*-designator is tested to determine which index (B-Register), if any, is to control address modification.

(4) If modification is stipulated (the *b*-field exceeds 0) the lower half of the contents of the specified index register (B-Register) is transferred to the adder in the Index Subsection 34.

(5) The *u*-field, with two binary zeros placed to the immediate left thereof, are transferred to the index adder in the Index Subsection 34 where modification takes place by adding the 18-bit B-Register portion and the 18-bit *u*-designator portion by a 1's complement addition.

(6) After the index modification takes place, the address is tested to see if any of the following conditions exist (a) *u*-field greater than $200_8$ and *i*- equals 0; (b) *f*- is a specified operation not relevant to this operation; or (c) the effective address "U" is a shift count. If any of these conditions exist, operation continues on immediately to step 7. In the event the foregoing conditions do not exist, the base relative addressing operation takes place to form the effective absolute memory address "U." The operation involving the base relative addressing portion of the control section will be described in more detail below.

(7) After the absolute address "U" is determined, the address is transferred from the index adder in the Index Subsection 34 to the Storage Class Control Subsection 32 where it is decoded for subsequent reference of the Main Memory 24.

(8) The *i*-field is tested to determine whether direct or indirect addressing is stipulated.

(9) When modification is specified, the *h*-designator in the current instruction is tested to determine whether the index register modified is to be increased or decreased.

(10) After incrementation, the new modifier is sent into the lower half of the index register specified by the *b*-field. The increment remains unchanged.

(11) The operand address is transferred from the Storage Class Control Subsection 32 to the appropriate memory module address selector.

(12) The entire 36-bit content of the storage location specified by the memory module address selector are transferred into an appropriate register associated with each memory unit.

(13) The contents of the A-Register specified in the current instruction are transferred from the A-Registers 16 to an arithmetic register which is the X-Register 19.

(14) The actual data transfer is in accordance with the *j*-designator interpreted in step 1 and is made from Main Memory 24 to the Arithmetic Section 10.

(15) The Program Address Subsection 28 has the P-Register 38 increased by one to provide for the sequential execution of the next instruction.

(16) The next instruction, stored at the address now contained in the P-Register 38 is referenced in Memory 24.

(17) The circuitry alerted by the *f*-designator in step 1 performs the desired arithmetic operation.

(18) The next instruction, reference in step 15, is sent to the Program Control Subsection 30.

FIGURE 3 illustrates the modular arrangement of the addressable memory section and illustrates the address ranges for the respective modules. It will be noted that the address ranges and the groupings of addressable registers is illustrative only, and limitation thereto is in no way intended. Each of the modules, indicated as 1, 2, 3, and 4, contain $100,000_8$ addressable memory registers. Further, each module utilizes independent addressing circuitry and independent read-write circuitry from all other modules. This effectively gives operation that appears like a plurality of independently operating memories arranged in the same system. It should be noted that not all of the modules need be utilized since the respective modules have this independent addressing capability. Each of the modules is subdivided into $100_8$ memory blocks. Each memory block contains $1,000_8$ independent addressable registers. Taking block 1 as illustrative, it can be seen that the block addresses range from $000_8$ through $077_8$. The corresponding range of memory register addresses is from $000000_8$ through $077777_8$. By using at least two modules, an operating program can overlap the execution of one instruction with the fetching of the next instruction. This so-called alternate bank operation permits the next instruction to be initiated prior to the completion of the instruction under execution if the instructions are stored in one bank and the data words are stored in the second bank or modules. The alternate bank operation is made possible by the independent addressing capability of each module. Assuming a system including only modules 1 and 2, it can be seen that for alternate bank operation area $I_1$ could be assigned to the first module for storing instructions and area $D_1$ can be assigned to module 2 for storing data and operands. As an alternate capability, assuming all four modules are used, the area $I_2$ which encompasses modules 1 and 2 can arbitrarily be designated to store instructions, and the area designated $D_2$ which encompasses modules 3 and 4 can be utilized to store data and operands. Of course, it can be seen that if the instructions cannot be contained in modules 1 and 2 and requires a portion of module 3, that these three modules can all be incorporated in the I bank and that the remaining module 4 can be utilized as the D bank. Various combinations can readily be accomplished. It should also be noted that for the base relative addressing system of the subject invention, it is only necessary to divide the two banks as a module point to accomplish the alternate bank mode of operation. If such alternate bank operation is not desired or necessary, the memory division point for the program in operation can be set as desired within the module. This will be described in more detail below. In the normal addressing sequence for the computer illustrated in FIGURE 1, the *u*-field is normally modified by one of the index registers, and the result of the modification is normally modified in parallel by two base relative modifiers. These base relative address modifiers define the starting location of two separate segments in the Main Memory 24. It will be recalled from above, that base relative addressing is not permitted for this embodiment in the Control Memory 22, which is comprised of $200_8$ memory locations. Having formed two separate absolute addresses, each of which refer to a different one of the memory segments in Main Memory 24, the appropriate absolute address is selected by using a memory pointer constant designated BS. One of the memory segment base addresses is referred to as BI, and the base address for the second segment is called BD. The description of how these values are determined will be set forth below. FIGURE 4 illustrates the Internal Function Register format and indicates the storage positions of the three base relative address constants just mentioned. The base address of the segment in Main Memory 24 which has the highest numerical relative address is BD and resides in bit positions 0 through 7 of the Internal Function Register. Bit position 8 is not used. The memory pointer constant BS resides in bit positions 9 through 15 and is 7-bits. Bits 16 and 17 are not used. The base address constant for the memory segment of Main Memory 24 which has the lower relative numerical address is BI and resides in bits 18 through 25 (8-bits) of the Internal Function Register. The remainder of the Internal Function Register (F-portion) performs control selections not relevant to the base relative addressing system and will not be described. The base relative address modifiers BI and BD remain constant for the operation of the program. Therefore, the executive program (main control program) can relocate the entire program anywhere in memory for subsequent execution. For example, a worker program, its data, or both, may be moved anywhere in the memory and executed without modification of the program except for changing the base relative address modifiers BI and BD and area pointer BS. The moving of the worker program is not under control of the worker program, but instead, under control of the executive control program. In operation, users of the computer may not be aware that the base relative addressing operation or program relocation is taking place. The control function is executed solely by the executive control program which determines the most efficient use of the memory locations available in Main Memory 24 and assigns the designated worker programs accordingly. This feature provides a great deal of versatility to the combination of worker programs that can be available for execution in the Main Memory 24 at any given time, and eliminates memory segmentation which greatly hampers the sequential or time-shared performance of worker programs. It should be noted that though the base relative address modifiers BI and BD and the memory section pointer BS are illustrated in a single register, that this is illustrative only, and that the operation is such that each of the modifiers is essentially a separate register arrangement. The Internal Function Register is guarded against change during the execution of a particular worker program so that it is not possible for the computer to modify the constants stored in the Internal Function Registers. Such a change would alter the addressing instruction for the entire program. This protection is accomplished by circuitry not shown. BI and BD are computed by the executive routine every time a program is loaded into the Memory Section 24 or is relocated in the Memory Section. To understand the operation of the executive routine for these purposes it is necessary only to recall that each memory module is divided into $100_8$ blocks of memory registers, with each block having $1000_8$ individual addressable registers. Before the program to be executed is loaded into Memory 24, the executive routine checks to see how many storage locations are required by the program. For this embodiment, a limitation is imposed that any block which is utilized in full or only partially utilized by a given program, is not used for further storage. In other words, if two $1000_8$ blocks are filled completely by instruction words, the data words can be assigned to the next sequential block of memory or to some other block of memory. If on the other hand, only a partial block is required for the instructions, the data words will be stored starting in a different block. This is felt to be an advantageous break-down in the utilization of the memory, and it should be noted that by adding the appropriate circuitry, that the Memory 24 could be sequentially used. In other words, if only one storage location of the D or I fields is placed in a block, the unused portion of that block cannot be used to store another program until the complete field is moved or unloaded.

FIGURE 5 is an illustration of an example of the break-down of the I-area and the D-area in a memory system for a specific example of the instructions and data words. For this example, it can be assumed that the I-area is utilized to store instructions and that the number of instructions is represented by LI. For this example, there are $2000_8$ instructions. It is further assumed that the number of data storage registers required is represented by LD, and is equal to $5000_8$ for this example. The data storage area is designated D-area of the memory. The cross-hatched portion of the memory will be considered to be used for storage of other programs or unused. The starting addresses of the instructions and the data word areas will arbitrarily be selected as $003000_8$ and $106000_8$ respectively. It will be recalled from above that in the instruction the *u*-field is used to specify the address of an operand which is to be used in the operation to be specified by the instruction. When the *u*-field specifies a program relative address rather than an absolute memory address, the base relative addressing system is utilized. The relative address for the first instruction for the example illustrated in FIGURE 5 would be $000000_8$ and the relative base address constant BI must be added to correctly specify the absolute memory address. Therefore, it can be seen that for this example the base relative address constant BI would be set $003000_8$. Since the number of instructions LI is $2000_8$, it is determined that the data is stored at least $2000_8$ addresses from the initial storage location of the first instruction in the I-area. It will be recalled that it was arbitrarily decided that the D-area would have an initial absolute address of $106000_8$. The program relative address for the initial word of storage in the D-area will be $2000_8$. Accordingly, the base relative address constant BD will be set to $104000_8$ since it is desired that the initial address is to be $106000_8$. The initial storage location of the I-area will be designated $I_0$ and the absolute address at which data words are stored in the D-area will be designated $D_0$. The following general equations for calculating the values of the relative address constants BI and BD are as follows:

$$BI=I_0 \qquad \text{(Equation 1)}$$

$$BD=D_0-LI \qquad \text{(Equation 2)}$$

As illustrated in FIGURE 5, the absolute address of memory locations in the I-area may be formed by adding the program relative address starting with addresses $000000_8$ to the base address constant BI, and the absolute address of storage registers in the D-area may be formed by adding the program relative address starting with address $2000_8$ to the base relative address constant BD. When indexing is required by the instruction word, of course, it is apparent that the appropriate B-register (BL) will also be added. To speed the operation, for this embodiment, each program relative address specified in the *u*-field of the instruction is added simultaneously to both of the base relative address constants BI and BD. The appropriate absolute address of the two thus formed absolute addresses is selected for accessing the Memory Section 24. In order to perform the selection of which of the two absolute addresses is desired, it is necessary to have an additional constant. This third constant is designated the memory area break-point pointer and is designated as BS. The value of the constant BS is determined by the following equation:

$$BS=LI \qquad \text{(Equation 3)}$$

The memory area break-point pointer BS is utilized such that when the sum of the program relative address (*u*-field) plus the B-register indexing, if any, is less than or equal to the constant BS, the I-area is indicated. Alternatively, when the sum of the program relative address (*u*-field) plus indexing is greater than the memory area break-point indicator BS, the absolute address relating to the D-area is selected. The foregoing will be described in greater detail below. The foregoing equations are general in form and they assume that the base relative address constant BI and BD as well as the memory area pointer constant BS are fully defined by the same number of bit characters as are utilized in the memory address portion of the instruction word as defined by the *u*-field. It will be seen from the following discussion that further restrictions are placed on the general equations and that in the actual embodiment described below, that further limitations are placed on the addressing system and the utilization of these constants.

It will be recalled that a limitation was arbitrarily placed on the embodiment of the subject invention that when addresses are utilized in any portion of a block of memory, the remaining addresses in the block are not utilized. Accordingly, it can be seen that the lower three octal digits contribute no useful information when determining which block an address is in (see FIGURE 3). In order to economize on the hardware required in performing the addressing operation, the lower three octal digits (9-binary digits) can be ignored whenever it is only necessary to ascertain a block of address rather than a specific absolute address within a block. In performing the calculation of an absolute address, the *u*-field or an indexing register can be used to supply the lower 3 octal digits and there is no need to duplicate these digits in the base relative address constants BI and BD. This illustrates why the internal function register illustrated in FIGURE 4 shows only 8-bits respectively for the base relative address constants BI and BD. These constants are block values only. Similarly, the memory area pointer constant BS need not contain the lower 3 octal digits since it is concerned only with the number of blocks reserved for the I-area. Dropping of the three lower order BS digits precludes the assigning of consecutive program relative address numbers to the last storage location in the I-area and the first storage location in the D-area with the exception of when the number of storage locations in the I-area are an even multiple of $1000_8$. A further qualification existing for the subject embodiment arises from the fact that the first $200_8$ addresses referred to Control Memory 22 and are not subject to base relative addressing. This requires that the values determined for the base relative address constants be biased by an amount at least equal to $200_8$. In order to reflect this bias and the block approach to the calculation, and assuming the I-Bank is to start at a relative address right at $200_8$, the calculation of the memory area pointer constant BS would be more appropriately be determined by the following equation:

$$BS=\frac{LI+177_8}{1000_8} \qquad \text{(Equation 4)}$$

In Equation 4, the factor $177_8$ takes into account the bias factor for the Control Memory 22, and the divisor $1000_8$ takes into account the number of storage locations within each memory block. From the foregoing, then, it can be seen that calculation of the exact base relative address constant values depends upon:

(1) The absolute value of the first address of the initial block in which the instructions are to be stored ($003000_8$ for the example mentioned above and always a multiple of $1000_8$ for this embodiment);

(2) The absolute value of the first address of the initial block in which data words are to be stored ($106000_8$ for the assumed sample program and likewise always a multiple of $1000_8$ for this embodiment);

(3) The bias value, if any, added to the instruction program relative addresses;

(4) The number of blocks reserved for instruction words; and (5) The bias, if any, added to the data word program relative addresses.

The values of items 1 and 2 are determined by the executive routine and are dependent upon the manner of subdividing the memory which was previously defined as blocks of $1000_8$ addresses. Accordingly, items 1 and 2 will always be multiples of $1000_8$. Limitation thereto is in no way intended and other systems of dividing the memory are contemplated. The value of item 3 is arbitrary, and for this example, must be equal to or greater than $200_8$ to permit direct addressing of the Control Memory 22. Again, this is illustrative only and limitation to such a bias value is in no way intended, nor is it intended that a bias value be required in all instances. An illustrative situation can be established for the foregoing example (see FIGURE 5) and having a bias value of $200_8$. The following example provides a numerical illustration of how the base relative address constants could be determined for Example I.

EXAMPLE I $I_0=003\ 000_8 \qquad I_0'=003$ $D_0=106\ 000_8 \qquad D_0'=106$ $LI=002\ 000_8 \qquad LI'=002$ $LD=005\ 000_8 \qquad LD'=005$ where "'" denotes block addresses I area bias$=IB=000200_8$ D area bias$=DB=LI'+1=002+1=003_8$ $BI=I_0'=003_8=000\ 000\ 011_2$ $BD=D_0'-DB=106_8-003_8=103_8=001\ 000\ 011_2$ $BS=(LI-1+IB)$ less 3 lower octal digits $=(002000_8-1_8+200_8)=002_8$ In general terms, then, the divider constant BS is the D-Area Bias less 1. The octal arrangement in the Internal Function Register would appear as follows:

| | BI | BS | BD |
|---|---|---|---|
| F, | 003, | 002, | 103 |

Note that in the foregoing Example I that the calculations are based on memory block identification in a special form as indicated by the prime values, rather than in a general form as shown in Equations 1, 2, and 3 above.

FIGURE 6 illustrates the bit-alignment of operands which are to be added in the determination of the absolute address from the base relative address constants BI and BD. For this discussion, the *u*-field is broken into two portions, the higher and lower, respectively designated *uh* and *ul*. The *u*-field is not broken in half, but instead, the higher portion *uh* is comprised of bit positions $2^{15}$ . . . $2^9$; and the lower portion *ul* is comprised of bit positions $2^8$ . . . $2^0$. For this discussion, the "()" around a designator indicates that the quantity within the parentheses is an address at which an operand is stored. A quantity is indicated with "[]". Care should be made to distinguish between these two designations, since the parentheses indicate a quantity located at the designated address, whereas the quantity within the brackets is the operand itself. As a first step in the determination of the absolute memory address to be referenced from the program relative address designated in the *u*-field, the *uh* portion of the *u*-field is simultaneously added to the base relative address constants BI and BD. For the Bank-I portion of the determination, it can be seen that Adder 1 adds *uh*, which is 7-bits, to BI as a numerical quantity forming the resultant sum $uh+BI$ in bit positions 9 through 17 with *ul* being carried forward. For the Bank-D portion of the calculation, Adder 2 performs a similar addition with *uh* and BD. To achieve maximum computational rate, each of the additions are performed in parallel, and occur simultaneously as previously mentioned. During a second add time, three separate sums are formed simultaneously in three separate and distinct adder networks designated Adder 3, Adder 4, and Adder 5. Adder 3 is associated with the Bank-I calculation and forms the sum of the designated index register BL as an 18-bit quantity with the sum resulting from Adder 1. This results in a second sum $[uh+BI;\ ul]+(BL)$ and is one of the two possible absolute addresses calculated. In a similar manner, Adder 4 forms the sum of the index register BL, if any, with the initial sum provided from Adder 2. The 18-bit addition of Adder 4 results in the second alternative absolute address quantity $[uh+BD;\ ul]+(BL)$. Note that ";" designates the combination of a sum portion and the carried forward value *ul*. The selection of the actual absolute address will be made between these last two mentioned quantities. Also during the second add time, Adder 5 performs an 18-bit addition of the operand stored in the designated B-Register (BL) and the 16-bit *u*-field with 00 padded in the bits 16 and 17 positions. This results in the sum $u+(BL)$. To make the actual selection of the absolute address from the two possible alternatives described in the foregoing, a comparison is made between the memory area pointer constant BS, which is 7-bits, and the upper 9-bits of the sum resulting from Adder 5. These upper 9-bits are $[u+(BL)]$ and are the bit positions 9 through 17 of the Adder 5 sum. The comparison then is BS: $[u+(BL)]$ upper 9-bits. To actually make the selection of the absolute address, the I-Bank absolute address is selected if BS is less than or equal to $[u+(BL)]$; and the D-area absolute address resulting from Adder 4 is selected if BS is greater than the quantity $[u+(BL)]$. Once the comparison is made and the appropriate absolute address selected from Adder 3 or Adder 4, it should be pointed out that the other address as calculated will not be used. Before presenting some numerical examples of the base relative addressing location system, attention is directed to FIGURE 7*a* which sets forth the format of the Storage Limits Register. The subject invention utilizes in combination therewith a selective lockout of computer memory system. This system is similar to that described in patent application Ser. No. 204,411 and filed June 22, 1962, by Duane H. Anderson, entitled Selective Lockout of Computer Memory, and assigned to the assignee of the subject invention. The computer lockout system will be described in a little more detail in the consideration of FIGURE 7. Briefly stated, it operates when activated to set a zone of addresses in the Memory 24 which cannot be altered by a programmed instruction which attempts to write new information into one of the storage locations within the established zone in the Memory Section. In FIGURE 7*a* it can be seen that for the I-portion of Memory 24, that the upper limit is designated by $I_u$ and is comprised of bit positions 35 . . . 27. The lower limit of the I-area is specified as $I_L$ and is denoted in bit positions 26 . . . 18 of the Storage Limits Register. The upper and lower limits of the D-area of Memory 24 are respectively designated as $D_u$ in bit positions 17 . . . 9, and $D_L$ in bit positions 8 . . . 0. For the embodiment of this invention, the storage limits are established on a memory block basis, hence, 9-bit positions for specifying each limit is adequate. If it were desired to lockout areas of Memory 24 down to the specific address, it would be necessary to specify 18-bit positions for each area and for each of the upper and lower limits thereof. Once the lockout area of the memory is selected for an operating program, writing cannot take place in the specified zones and the contents of the registers within the zones cannot be programmably altered. When the memory lockout system is activated, it operates each time an instruction specifies an operation to check the address to see whether it falls within the range specified as the upper and lower limits. If a writing operation falls within the lockout area, a fault is generated and writing is prohibited. If the address which is to be written into is not within the lockout range, it is permitted to proceed to completion. It is not felt that further detail description of this system of memory lockout is necessary for an understanding of the subject invention.

The following examples of loading five illustrative programs into Memory 24 will indicate how the base relative addresses for each program are determined, and how the programs are assigned areas in Memory 24. It is assumed that four modules are available. It will be assumed that the five programs are designated V, W, X, Y, and Z and are loaded in that sequence. It is further assumed that the executive routine which performs the loading operation has instruction stored in blocks $000_8$ through $013_8$ and requires data storage of blocks $365_8$ through $377_8$. The blocks intermediate are available for storage of the instruction words and the data words for the respective programs. The executive routine will check the memory block listing of available locations and place the larger quantity of words for the I or D area of the incoming program in the area of memory which has the least number of blocks previously assigned. If after the evaluation of the program being loaded, it is determined that the base address for the D-area (BD) is found to be a negative, the executive routine will interchange the I- and the D-areas in the Memory 24. With these prerequisites in mind, the executive routine would operate on the example programs to store them in memory according to the following examples.

PROGRAM V

Memory blocks available 014–364$_8$
Area with least number of memory blocks in use? Upper

| | I-Field | D-Field |
|---|---|---|
| Quantity of words | 10,000$_8$ | 5,000$_8$ |
| Relative addresses | 200–10 177$_8$ | 11 000–15 777$_8$ |
| Memory blocks assigned | 354–364$_8$ | 014–020$_8$ |
| Absolute addresses | 354 200–364 177$_8$ | 14 000$_8$–20 777$_8$ |
| IFR $B_I$=354$_8$ | $B_S$=010$_8$ | $B_D$=14$_8$−(10$_8$+1) =003$_8$ |
| Storage Limit Register | $I_u$ 364$_8$   $I_L$ 354$_8$ | $D_u$ 020$_8$   $D_L$ 014$_8$ |

PROGRAM W

Memory blocks available 021–353$_8$
Area with least number of memory blocks in use? Lower.

| | I-Field | D-Field |
|---|---|---|
| Quantity of words | 30,000$_8$ | 20,000$_8$ |
| Relative addresses | 200–30 177$_8$ | 31 000–50 777$_8$ |
| Memory blocks assigned | 021–051$_8$ | 334–353$_8$ |
| Absolute addresses | 21 200–51 177$_8$ | 334 000–353 777$_8$ |
| IFR $B_I$=021$_8$ | $B_S$=030$_8$ | $B_D$=334$_8$−(30$_8$+1) =303$_8$ |
| Storage Limit Register | $I_u$ 051$_8$   $I_L$ 021$_8$ | $D_u$ 353$_8$   $D_L$ 334$_8$ |

PROGRAM X

Memory blocks available 052–333$_8$
Area with least number of memory blocks in use? Upper

| | I-Field | D-Field |
|---|---|---|
| Quantity of words | 5,000$_8$ | 20,000$_8$ |
| Relative addresses | 200–5 177$_8$ | 6 000–25 777$_8$ |
| Memory blocks assigned | 052–057$_8$ | 315–334$_8$ |
| Absolute addresses | 52 200–56 177$_8$ | 315 000–333 777$_8$ |
| IFR $B_I$=052$_8$ | $B_S$=005$_8$ | $B_D$=315$_8$−(5+1) =307$_8$ |
| Storage Limit Register | $I_u$ 056$_8$   $I_L$ 052$_8$ | $D_u$ 333$_8$   $D_L$ 315$_8$ |

PROGRAM Y

Memory blocks available 057–314$_8$
Area with least number of memory blocks in use? Lower

| | I-Field | D-Field |
|---|---|---|
| Quantity of words | 45,000$_8$ | 65,000$_8$ |
| Relative addresses | 200–45 177$_8$ | 46 000–132 777$_8$ |
| Memory blocks assigned | 247–314$_8$ | 057–143$_8$ |
| Absolute addresses | 247 200–314 177$_8$ | 57 000–143 777$_8$ |
| IFR $B_I$=247$_8$ | $B_S$=045$_8$ | $B_D$=057$_8$−(45$_8$+1) =011$_8$ |
| Storage Limit Register | $I_u$ 314$_8$   $I_L$ 247$_8$ | $D_u$ 143$_8$   $D_L$ 057$_8$ |

PROGRAM Z

Memory blocks available 144–246$_8$
Area with least number of memory blocks in use? Upper

| | I-Field | D-Field |
|---|---|---|
| Quantity of words | 60,000$_8$ | 15,000$_8$ |
| Relative addresses | 200–60 177$_8$ | 61 000$_8$–75 777$_8$ |
| Memory blocks assigned | 166–246$_8$ | 144–160$_8$ |
| Absolute addresses | 166 200–246 177$_8$ | 144 000–160 777$_8$ |
| IFR $B_I$=166$_8$ | $B_S$=060$_8$ | $B_D$=144$_8$−(60$_8$+1) =63$_8$ |
| Storage Limit Register | $I_u$ 246$_8$   $I_L$ 166$_8$ | $D_u$ 160$_8$   $D_L$ 144$_8$ |

From the foregoing examples, it can readily be seen that varying size programs having varying size data storage requirements can readily be located within Memory 24 by using the subject inventive concepts without requiring extensive changes to the program structure to be provided by the programmer, and avoids the necessity of re-arranging absolute address within the program for changes in the storage location where the program is to operate.

FIGURE 7 illustrates one embodiment of the subject invention. In this presentation a heavy line terminated in an arrowhead represents a conductor cable including a plurality of parallel conductors and indicates the direction of data-signal flow. The light lines terminated with an arrowhead indicate control paths, and are normally only single conductors, though a plurality of gates are often controlled by the pulses carried on the line. The Internal Function Register is illustrated within dashed block 40 and includes a separate portion for storing the F-control signals 42, the I-area base address BI 44, the D-area base address BD 46, and the memory area pointer constant BS 48. The various portions of the Internal Function Register 40 are loaded from the Control Section 26 via transmission lines 50. The instruction word is stored in the Instruction Register 52, with the instruction word being provided on parallel conductors along cable 54 to the Load Gates 56. FIGURE 8 illustrates the timing intervals and sequences necessary to control the operation of the addressing system. Specific control pulses are not illustrated since the specific control is well within the skill of logic designers. Instead, the timing intervals for each of the steps are illustrated. No time scale is illustrated since the operating ranges of the various logic circuits which can be used to implement the subject invention will each require special timing considerations. The various specified intervals will be described below. At the appropriate time during the T2 interval an enable pulse will be provided on conductor 58 from the Control Section. This pulse will allow the instruction word to be loaded in parallel into the Instruction Register 52. The Main Memory 24 for this embodiment is comprised of a plurality of magnetic core storage registers of a type well-known in the art and is capable of being divided into at least two independently addressable sections designated the addressable memory section I and the addressable memory section D. The specific arrangement of Memory 24 is that illustrated in FIGURE 3 and described above. Associated with Memory 24 are Sense Amplifiers 60 which operate to detect the storage state of the selected memory register and provide the output indications along cable 62 to a transfer register (not shown). The Address Translation Circuitry 64 is of a type well-known in the art and, as described above, there is separate translation and addressing circuitry for each of the memory modules. The Address Translation Circuitry in one characteristic form can be the diode matrix translation type. Operation is such that when addresses are presented to the input of the Address Translation Circuitry 64, it operates to provide signals on cable 66 which enables the write-in or the read-out of the selection portion of Memory 24. The B-Registers 68 are contained in the Control Memory 22 of the computer, but are intimately utilized by the subject invention. As described above, the Index Subsection 34 operates to decode the *b*-field of the instruction word and perform the selection of the appropriate B-Register. The signal selecting the output of the appropriate B-Register is supplied on one of the cables included in path 70 and directed from the Index Subsection 34. The B-Registers, as described above, are incorporated in integrated circuit flip-flop registers; hence, when an enable is supplied to the B-Register selected, it continuously provides an output on one of the output lines shown as dashed lines 72. The embodiment of the subject invention utilizes five parallel full adder systems. These adders include Full Adder 1 labeled 74, and Full Adder 2 labeled 76. These two adders are respectively capable of adding two 8-bit operands. The other adders in the system are Full Adder 3 labeled 78, Full Adder 4 labeled 80, and Full Adder 5 labeled 82. Each of these last three mentioned adders are capable respectively of adding two 18-bit operands. The encircled number within each of the adder blocks indicates the number of bits in the operands added by the adder. These adder circuits can be any of several well-known adder types, but preferably are adders that operate in a parallel mode to achieve the maximum speed of computation. A characteristic adder which could be utilized in the subject embodiment, is described in the application for United States Patent of Herman Osofsky, Ser. No. 183,449, filed Mar. 29, 1962, for an invention entitled Arithmetic Circuit, and assigned to the assignee of the subject invention. It is to be understood however, that limitation to such adders is in no way intended and that the adder described in the aforementioned copending patent application is intended to be illustrative only. Full Adder 1 receives an operand input in parallel along path 84 from the BI register 44. The *uh* portion of the *u*-field is supplied to the Level 1 Add Gates 86 via the path 88, and thence to Full Adder 1 on line 90, and to Full Adder 2 on line 92. Full Adder 2 receives the base address constant BD from the BD register 46 along path 94. It will be recalled from a consideration of FIGURE 6 that *uh* is the higher ordered 7-bits of the upper 7-bits of the *u*-field, and is combined respectively with the 8-bit BI and BD base address constant. Full Adder 1 and Full Adder 2 operate simultaneously to perform their respective additions. The sum generated by Full Adder 1 is referred to as S1 and is provided on cable 96 as an input to Full Adder 3. The 8-bits representing the sum S1 of $uh+BI$ is directed to the higher ordered portion of Full Adder 3 corresponding to bit positions 9 through 16. At this time, the lower ordered portion *ul* of the *u*-field of instruction register 52 is directed along cable 98 to the lower ordered portion of Full Adder 3. These stages are the designated 0 through 8. The operand quantity $[uh+BI;\ ul]$ forms one of the operands to be added, and the other operand is the 18-bit quantity stored in the designated B-Register BL. The index quantity is provided on 18-conductors 100 and forms the other operand for Full Adder 3. The final sum S3 resulting at the output of Full Adder 3 on cable 102 represents one of the two alternative absolute addresses that are generated. Full Adder 2 provides an 8-bit quantity indicative of the sum S2 of $uh+BD$ on path 104. This is directed to stages 9 through 16 of Full Adder 4. This sum S2 in conjunction with the *ul* portion of the *u*-field which is provided on path 106 as an input to stages 0 through 8 of Full Adder 4, comprise one of the operand quantities which is utilized in forming the alternate absolute address. The selected B-Register BL provides an 18-bit quantity on line 108 which is the other operand added by Full Adder 4. The resultant sum S4 of the quantity $[uh+BD;\ ul]+(BL)$ is provided on path 110 and is the alternative absolute address calculated for the subject invention. Full Adder 3 and Full Adder 4 operate in parallel at the same time interval to form their respective absolute address values in order to achieve a maximum computational rate. A further addition is performed at the same time as those done by Full Adder 3 and Full Adder 4, and is accomplished by Full Adder 5 labeled 82. Full Adder 5 receives a 16-bit quantity from the *u*-field along path 112 to its lower ordered 16 stages. The higher ordered two stages of Full Adder 5 are packed with zeros, thereby making a full 18-bit operand. The other operand utilized by Full Adder 5 is the contents of the selected B-Register designated as (BL). The sum S5 that results from the operands *u* and (BL) is available at the output of Full Adder 5. Only a portion of this operand is directed along path 114 as an input to Compare Circuit 116. The portion that is directed to Compare Circuit 116 is the highest ordered 9-bit position. The other input to Compare Circuit 116 is provided along path 118 from the BS-Register portion 48 of the Internal Function Register 40. The BS constant is the memory area divider pointer and determines which of the two absolute addresses available on cables 102 and 110 will actually be presented to the Address Translation Circuitry 64 for selection of the appropriate memory storage register in Main Memory 24. Compare Circuit 116 provides an enable pulse on line 120 when it is determined that the pointer constant BS is greater than or equal to the higher ordered 9-bits of the sum $[u+(BL)]$. Alternatively, Compare Circuit 116 provides an enable signal on path 122 when it determines that the memory area pointer constant BS is less than the higher ordered 9-bit positions of the sum $[u+(BL)]$. The Compare Circuit 116 can be any circuit well-known in the art, for example, a simple subtracting circuit in which one operand is subtracted from the other operand with a resulting difference and sign. The result will have an arithmetic sign indicative of the relative magnitude of the operands being compared. The sum S3 generated by Full Adder 3 and carried on cable 102 is provided as an input to the I-Gates 124 in combination with the enable provided on line 120, and a control signal presented on line 126 for timing the operation of the I-Gates. The result S4 generated by Full Adder 4 and provided on cable 110 is directed to the D-Gates 128 in conjunction with the enable presented from Compare Circuit 116 on line 122 and the timing control pulse received on line 130. The I-Gates 124 and the D-Gates 128 are illustratively AND gates comprised of diodes or the like. The gates operate such that there is an input for each bit position in the sums generated by Full Adder 3 and Full Adder 4 and the enable signals presented on lines 120 and 122 are fed to their respective I and D Gate circuits in combination with the timing pulse applied on lines 126 and 130. In order to complete the gating operation such that an output from the I-Gates would be present on cable 132, it is necessary that the Full Adder 3 present its sum to the I-Gates 124 the Compare Circuit 116 to present an enable on line 120, and the timing pulse to be present on line 126. When the foregoing conditions are satisfied, the sum S3 generated by Full Adder 3 will be gated through the I-Gates into the I-Memory Lockout Circuitry 134. In a similar manner, the D-Gates 128 will provide the sum S4 resulting from Full Adder 4 on cable 136 when the timing pulse is available on line 130 and when the Compare Circuit 116 provides an enable pulse on line 122. On these conditions, the D-Gates will pass the sum S4 from Full Adder 4 along line 136 into the D-Memory Lockout Circuitry 138. The Storage Limit Register is shown enclosed in dashed block 140 and is of the type described in FIGURE 7*a*. The half of the Storage Limit Register designated I-Limits corresponds to the $I_U$ and the $I_L$ of FIGURE 7*a* and defines the upper and lower limits in storage for the I-area in which writing is prohibited. The I-Limits are provided along cable 142 as inputs to the I-Memory Lockout Circuitry 134. The D-Limits 144 are provided along line 146 as inputs to the D-Memory Lockout Circuitry 138. The I-Memory Lockout Circuitry 134 and the D-Memory Lockout Circuitry 138 are respectively similar to the circuitry described in the above identified co-pending patent application. When the I-Gates 124 are activated by the enable on line 120, and the I-area is selected as the area for the absolute address, and when the I-Memory Lockout Circuitry 134 has determined that the absolute memory address calculated and provided as an output on line 102 from Full Adder 3 is not within the prohibited range, the absolute address is provided on line 148 to the Address Translation Circuitry for the selection of the identified storage location in the Addressable Memory Section I. In the alternative, when the Compare Circuit 116 indicates that the absolute address S4 calculated by Full Adder 4 is to be utilized, and the D-Memory Lockout Circuitry 138 established that the absolute address is not within the prohibited range as defined by the D-Limits 144, the absolute address is provided on line 150 to the Address Translation Circuitry 64 for selection of the addressable register in Memory Section D. It should be noted that indexing is an advantageous part of the embodiment of this invention, but that the output sums S1 and S2 along with the remainder of the *u*-field can be the absolute addresses.

The Fetch Gates 152 are coupled to a control line 154 for controlling the selection of program instructions to be read from Memory 24. The instruction address is held in the P-Register 38 and provides as an address on cable 156 to the Fetch Gates. During the cycle of the computer when a new instruction is required to be loaded in the Instruction Register 52, an enable signal is provided on line 154 to gate the instruction address into the Address Translation Circuitry 64 via line 158. The B-Gates 160 receive a timing control input signal during interval time T4 on conductor 162 and receive the 18-bit contents of the selected B-Register on line 164. The occurrence of the enable on line 162 initiates the passage of the operand stored in the selected B-Register along cable 166 into Full Adder 5. The Level 2 Add Gates 168 receive the signals indicative of the operands stored in the selected B-Register on cable 170 and are enabled by a pulse received during time interval T5 on control path 172 for gating the B-Register operand into Full Adder 3 and Full Adder 4 as previously described.

To fully understand the addressing system described above, it is believed a specific numerical example will assist in the understanding of the concepts and operation. The numerical example will be set forth below and the circuit of FIGURE 7 in arriving at the results illustrated will then be described. For this example, it is assumed that Program V, loaded above, is being executed by the computer illustrated in FIGURE 1. Accordingly, the Internal Function Register (IFR) 40 is loaded as shown below with the relative address constants as calculated for Program V. Also, the Storage Limits Register 140 is loaded as shown below with the I- and D-field limits as calculated. Additionally, it is arbitrarily assumed that the index register to be referenced is loaded with the constant $(BL)=000010_8$. The instruction to be executed is as set forth with the various designators not being specified other than for the selection of the B-Register as BL. The relative address in the Main Memory 24 is specified in the instruction to be executed is $022000_8$. The result of Full Adder 1 forming the sum S1 of *uh* and BI is $376_8$ and the result of Full Adder 2 forming the sum S2 of *uh* and BD is $025_8$. Since the selected B-Register is BL Full Adder 3 forms the sum S3 $376010_8$ and Full Added 4 forms the sum S4 $025010_8$. Full Adder 5 is forming the sum S5 to determine which area of memory is to be selected and forms the sum of *u* and (BL) as $022010_8$. When the comparison BS: $u+(BL)$ is made, it can be seen that the value of BS ($010_8$) is less than the upper portion of the result formed by Full Adder 5 ($022_8$). Hence, the absolute address formed by Full Adder 4 for the D-area is selected (see FIGURE 7). When the D-area limits check is made, it will be seen that $025_8$ is outside the prohibited range of $D_U=020_8$ and $D_L=014_8$; hence, the memory reference can be made.

ADDRESSING EXAMPLE

| | BI | BS | BD |
|---|---|---|---|
| IFR=F.................. | $354_8$ | $003_8$ | $003_8$ |
| | BI | BS | BD |
| =F.................. | 011 101 100 | 000 001 000 | 000 000 011[2] |

Storage Limits Register = $364_8$ $354_8$ (I) $020_8$ $014_8$ (D)

$(BL)=000010_8=000\ 000\ 000\ 000\ 001\ 000_2$

Instruction to be executed = f j a BL h i $022000_2$

| I-AREA | D-AREA | |
|---|---|---|
| FULL ADDER 1 | FULL ADDER 2 | |
| $uh=022_8$ | $uh=022_8$ | |
| $BI=354_8$ | $BD=033_8$ | |
| $S1=376_8$ | $S2=025_8$ | |
| FULL ADDER 3 | FULL ADDER 4 | FULL ADDER 5 |
| $376\ 000_8$ | $025\ 000_8$ | $U=022000_8$ |
| $(BL)=000\ 010_8$ | $(BL)=000\ 010_8$ | $(BL)=000010_8$ |
| $S3=376\ 010_8$ | $S4=025\ 010_8$ | $S5=022010_8$ |

BS: u+(BL)

$010:<022_8$

[BS]<[u(BL)]

∴SELECT $025\ 010_8$ as absolute address $D_U=020_8$ and $D_L=014_8$ so $025_8$ is outside prohibited area Referring again to FIGURE 7, the foregoing example will be traced through the circuitry shown. As mentioned, the Internal Function Register 40 is loaded with the values as shown. The Instruction Register is not yet loaded. During interval T1 an enable will be presented on line 154 to the Fetch Gates 152 which will present the address held in the P-Register 38 to the Address Translation Circuitry 64 for calling out the instruction to be executed. The Address Translation Circuitry 66 selects the designated storage location and causes the instruction to be executed to be provided on line 62 to the transfer register (not shown). The instruction to be executed will be transferred from the transfer register along line 54 via the Load Gates 56. During time interval T2 an enable pulse is provided on line 58 for allowing the instruction to be entered into the Instruction Register 52. At that time, the instruction is translated as described above, and the various actions initiated. During time interval T3 an enable pulse is provided to Level 1 Add Gates 86 for gating the *uh* portion of the *u*-field along cable 88 into Full Adder 1 via line 90, and Full Adder 2 via line 92. The operand thus presented to Full Adder 1 and Full Adder 2 on lines 90 and 92 respectively will be $022_8$. BI is provided as an input on cable 84 to Full Adder 1, and for this example is $354_8$. The sum S1 resulting from Full Adder 1 on cable 96, and presented to Full Adder 3 is $376_8$. The *ul* portion provided on line 98 to Full Adder 3 is $000_8$, as is the *ul* portion provided on line 106 to Full Adder 4. Full Adder 2 receives the BD constant $003_8$ via line 94 in addition to the *uh* portion of the *u*-field, and form the sum S2 on cable 104 of $025_8$. During time interval T4 an enable signal is provided on line 162 for gating the B-Gates 160 and initiating the transfer of the B-Register BL into Full Adder 5 along cable 166. The *u*-field is also provided as an input to Full Adder 5. The sum S5 resulting from the operation of Full Adder 5 is provided on 114 and for this example is $022010_8$. During time interval T5 the Level 2 Add Gates 168 are enabled by a pulse on line 172, and thus enables the selected B-Register BL operand to be provided as inputs to Full Adder 3 and Full Adder 4 via lines 100 and 108 respectively. The sum S3 generated by Full Adder 3 is the I-area absolute address and is $376010_8$. The absolute address S4 generated by Full Adder 4 is the D-area absolute address and is $025010_8$ for this example. The Compare Circuit 116 operates to compare the memory area pointer constant BS, which is $010_8$, against the upper portion of the sum S5 formed by Full Adder 5, which is $022_8$ for this example. It can be seen that $010_8$ is less than $022_8$; hence, a signal will be provided on line 122 which will indicate that the D-area absolute address is to be selected. During time interval T6 a control signal will be provided on line 130 to acvtivate the D-Gates 128 for presenting the D-area absolute address to the D-Memory Lockout Circuitry. It can be seen that the upper limit $D_U$ of $020_8$ and the D-area lower limit $D_L$ of $014_8$ defines a area in memory which does not include the absolute memory address just calculated as $022_8$; hence, memory referencing is not prohibited and the D-area absolute address will be provided along cable 150 as an input to the Address Translation Circuitry 64 for accessing the designated memory address in the D-area of the Memory 24.

FIGURE 9 is a process diagram illustrating the steps in the subject inventive method for determining an absolute address in one of two possible addressable memory areas from a programmed relative address. At the start of the method, it is necessary to set the relative base memory address constants BI and BD, as defined in the foregoing equation as shown by block 200. It is then necessary to set the memory area divider pointer constant BS as shown by block 202. Having established the base relative address constants for the two memory areas and the area divider constant, a program instruction is read 204. The sum of the address field of the instruction and each of the base relative address constants are formed, 206. These are sum $S1=u+BI$ and sum $S2=u+BD$. The sum S5 of the relative address field of the instruction, and an index value, if any, is formed, 208. It is then necessary to simultaneously form the sum S3 and S4 by performing the additions S1 plus the index value, if any, and S2 plus the index value, if any, respectively shown as block 210. Having derived sums S3 and S4, which are the two possible absolute addresses, it is necessary to select one or the other of these sums as the absolute memory address to be accessed. This is done by comparing the memory area divider pointer BS against sum S5. The absolute address indicated by sum S3 is selected when the quantity BS is greater than or equal to sum S5, and absolute memory address indicated by sum S4 is selected when the value of BS is less than the sum S5. This comparison operation is indicated by block 212. Having selected one or the other sums S3 or S4 as the memory address to be accessed, the memory location indicated is accessed and the instruction is completed as indicated by block 214. Upon complettion of the instruction being executed, path 216 is taken to a point in the method where a new program step is read and the process completed until such time as all of the instructions have been executed.

FIGURE 10 illustrates the aforementioned capability of the subject invention to readily relocate either programs or data, or both, within the computer's Memory 24 without requiring a great deal of alteration of the program. As previously mentioned, it is necessary only upon relocation to establish new base relative address constants BI and BD. In FIGURE 10 the Memory 24 is graphically indicated as the upper and lower portions of the figure designated I-Bank and D-Bank. A portion of the I-Bank is arbitrarily loaded with an Initial Program designated 220, and a portion of the D-Bank is loaded with Initial Data designated 224. In their initial positions, the Initial Program 220 has a base relative address $BI_i$ and the Initial Data has a base relative address constant $BD_i$. First assuming it is desired to relocate the program to a higher address portion of the Memory 24, it is necessary to physically transfer the Initial Program 220 into the desired Relocated Program area 226 and to recalculate the base relative address constant. The Initial Program 220 is moved by a predetermined number of memory address locations indicated as ΔI. Therefore, the new base relative address constant for the program is established by adding the original base relative address constant $BI_i$ and the amount or number of storage locations moved ΔI. Thus, the final I-area constant BI, can be found from $BI_1+\Delta I$. The alternative to moving the program or data to higher ordered memory address locations is to move to lower ordered memory address locations. This is illustrated by the relocation of the data. The Initial Data 224 is moved from a higher ordered area in Memory 24 to a desired lower ordered portion of the D-bank in Memory 24. The Relocated Data is illustrated as block 228. The base relative address constant $BD_i$ must be recalculated for the Relocated Data 228. Again, the data is moved by a predetermined amount ΔD. Therefore, the base relative address constant $DB_f$ is determined by forming the difference of the base relative address constant $BD_i$ for the Initial Data 224 and the number of storage addresses ΔD. As illustrated, it is quite common to store the subroutine programs 230 at the highest ordered numerical address portion of Memory 24. They are normally thus placed so that they do not interfere with location of the programs and data within Memory 24.

It is common practice in many computers of the present day to provide for altering the sequence of instructions or for interrupting the sequence of instructions being executed, and for at least momentarily operating a separate and distinct set of instructions required as a result of the particular interrupt. For these situations, it is necessary to remember, or store, the address in the currently executed sequence of instructions to which it is desired that operation be returned upon completion of the operation requiring the interrupt or upon completion of the alternate sequence of the instructions. Since it is possible in the subject system that a program sequence currently being executed could be interrupted; and, during the period of interruption, be relocated within the memory of the computer, it is desirable and necessary to capture the relative program address rather than the absolute program address. FIGURE 11 illustrates the circuitry necessary for capturing the relative program address when the instruction sequence being executed is caused to be interrupted or altered. It will be noted that some of the circuitry illustrated in FIGURE 11 have previously been described in the base relative addressing system of FIGURE 7. In those instances where the same circuitry is illustrated, the same reference numerals will be applied. Upon the occurrence of a branching operation or the demand for an interrupt condition, the instruction presently being executed is carried to completion and a special instruction is executed which operates to capture and store the relative address to which the program must return to complete the operation being executed. At that time, the address of the instruction to which execution must return is contained in the P-Register 38 as an absolute address quantity. The circuitry which captures the relative address includes a flip-flop 240 which its input circuits 242 and 244 coupled to the enable lines 122 and 120 respectively of Compare Circuit 116. Flip-flop 240 is preferably comprised of a transistorized bistable circuit whose output terminals provide voltage levels indicative of the storage state of the flip-flop circuits. It is assumed that it takes a voltage level of a first value for instance a level representing a "1," to set the flip-flop to a Set condition, and that the same voltage level (1) is required to be applied to the Clear input terminal 244 to cause flip-flop 240 to be in the Cleared state. When flip-flop 240 has a Set pulse or voltage level applied to the Set input terminal 242, the Set output terminal 246 provides the same voltage level in this example a "1." The Clear output terminal 248 provides the complement value, for instance a logical "0." Alternatively, when a Clear pulse again a level indicating a logical "1," is applied to the Clear input terminal 244, the Clear output terminal 248 is activated for providing a logical "1," and the Set output terminal 246 carries the complement output pulse, a logical "0." When Compare Circuit 116 detects the condition that the memory area pointer constant BS is greater than or equal to the quantity $u+(BL)$ and provides an enable pulse on line 120, the Clear input terminal 244 will receive an activating pulse (for instance a logical "1") and cause flip-flop 240 to provide an output pulse on the Clear output terminal 248. This pulse is provided as an input to the BI-Gates 250. The BI-Gates are AND gates, preferably constructed of diode AND circuit. The BI-register 44 provides 9-bits of input signals via path 252 to the BI-Gates. The Capture Relative P-Enable is applied on line 254 to the BI-Gates 250, and to the BD-Gates 256. Therefore, when it is determined that it is desired to capture a relative P, and it is determined that the I-area had previously been activated, the I-area base relative address constant BI is passed through the BI-Gates 250 along line 258 into the Subtracter Circuitry 260. The higher ordered 9-bits ($Ph$) of the P-Register 38 are applied to the Subtracter Circuitry 260 along line 262, and the lower ordered 9-bits of the P-Register $Pl$ are applied along lines 264. The Subtracter Circuit operates to form the difference between the higher ordered 9-bits $Ph$ and the I-area base relative address constant BI, and to combine it with the lower ordered 9-bits of the P-Register $Pl$ to form a resultant 18-bit constant. This 18-bit constant is the program relative address, and is directed along path 266 into a Storage Address Register 268 where it is maintained until the program directs operation to return to the address from which the branching condition was generated. Alternatively, when Compare Circuit 116 provides an enable pulse on line 122 as a result of its comparison operation, the Set terminal 242 of flip-flop 240 is activated and the Set output terminal is caused to have an active signal (for example a logical "1") impressed thereon. At this time, the Clear output terminal 248 is deactivated (for example set to logical "0") and the BI-Gates 250 are disabled. When the Set output terminal 246 is activated and the signal applied to the BD-Gates 256, the base relative address constant for the D-area is read from the BD-Register 46 along path 270 into the BD-Gates 256. These gates are also preferably of the diode AND gate variety. The output of the BD-Gates 256 are applied along path 272 as alternative outputs to the Subtracter Circuit 260. For this condition, the Subtracter Circuit 260 forms the difference of the higher ordered 9-bits of the P-Register 38 P*h* and the D-area base relative address constant BD. This difference plus the lower ordered 9-bits P*l* of the P-Register form the program relative address which is taken from the output of the Subtracter 260 along path 266 into the Relative Program Address Register 268 where it is stored. From the foregoing it can be seen that by storing the relative address in the Relative Program Address Register 268 rather than storing the absolute address during the branching operation, that should the program be relocated during the branching operation, upon returning to the sequence of operation the program can be operated as though it had not been relocated simply by altering the base relative address constants.

The foregoing has intended to be illustrative of an embodiment of the subject invention and what is requested to be protected by Letters Patent is defined in the appended claims.

What is claimed is:

1. Memory addressing control apparatus for use with an addressable memory having a plurality of independently addressable storage registers for storing data and instruction word manifestations and having in instruction storage register with at least a portion thereof adapted for storing a base relative memory address to be accessed in the memory section, said base relative addressing system comprising: means for receiving signal manifestations indicative of a programmed base relative address for accessing a storage register; means for storing at least two selectively alterable base relative address constants and a memory area divider pointer address constant; first means for combining one of said base relative constants and the received programmed base relative address; second means operable substantially simultaneously with said first means for combining said second base relative address constants and the received programmed base relative address; selection means responsively coupled to said means for storing for evaluating said base relative address pointer constant for selecting one of said sums as an alternative absolute memory address to be accessed in the addressable memory.

2. Memory addressing control apparatus for use with an addressable memory having a plurality of independently addressable storage registers for storing data and instruction word manifestations and having an instruction storage register with at least a first portion thereof adapted for storing a base relative memory address and a second portion for indicating one of a plurality of indexing registers, said base relative addressing system comprising: means for receiving signal manifestations indicative of a programmed base relative address for accessing a storage register; means for storing at least two selectively alterable base relative address constants and a memory area divider pointer constant; first means for forming a first sum of one of said base relative address constants and the received programmed base relative address; second means operable substantially simultaneously with said first means for forming a second sum of the other of said base relative address constants and the received programmed base relative address; indexing means for forming first and second alternative absolute addresses by adding the index value, if any, specified in the instruction word to each of said first and second sums; and selection means responsively coupled to evaluate said base relative address pointer constant for selecting one of said first and second alternative absolute addresses as the absolute memory address to be accessed in the addressable memory.

3. Apparatus as in claim 2 and further including in combination memory lockout apparatus having a register for storing upper and lower addressable limits of a first memory area and upper and lower addressable limits of a second memory area, said limits being programmably alterable, a first memory area lockout circuit coupled to said upper and lower limit portion of said storage limit register for prohibiting writing in said first memory area when said first sum is an absolute address within the first area limits, and a second memory area lockout circuit responsively coupled to said upper and lower limit of said second area in the storage limit register for prohibiting writing in said second memory area when said second sum is an absolute address within the prohibited second area limits.

4. Memory addressing apparatus for use in an electronic computer having an addressable memory including a plurality of addressable memory registers and an instruction register having at least a portion thereof arranged for storing signals indicative of a base relative address and at least another portion thereof for indicating a selected one of a plurality of index registers, the base relative addressing apparatus comprising: a plurality of index registers individually selectable by the instruction words; first means for storing a first memory area base relative address constant; second means for storing a second memory area base relative address constant; third means for storing a memory area divider pointer constant; first adder means responsively coupled to said first means and to the base relative memory address portion of the instruction word for forming a first sum; second adder means responsively coupled to said second means and to at least a portion of said base relative memory address portion of the instruction word for forming a second sum; third adder means responsively coupled to said first adder means and to the selected one of said plurality of index registers specified in the instruction word for forming a third sum, said third sum being indicative of one of two possible alternative absolute memory addresses; fourth adder means responsively coupled to said second adder means and to the selected one of said plurality of index registers indicated in the instruction word for forming a fourth sum, said fourth sum being indicative of the second of two possible alternative absolute memory addresses; fifth adder means responsively coupled to the selected one of said index registers indicated in the instruction word and to the base relative memory address portion of the instruction word for forming a fifth sum; comparing means having a plurality of parallel input terminals and at least two output terminals, respective ones of said comparing means input terminals responsively coupled to at least a portion of said fifth adder means and to said third means for comparing said memory area divider pointer constant to at least a portion of said fifth sum, said comparing circuit providing an enable pulse on a first of said output terminals when said memory area divider pointer constant has a first numerical relationship to said portion of said fifth sum and for providing an enable signal on a second of said output terminals when said memory area divider pointer constant has a second numerical relationship to said portion of said fifth sum; first gate means coupled to said third adder means and to said first output terminal of said comparing circuit for selecting said third sum as the absolute memory address to be accessed when said first output terminal carries an enable signal; second gate means responsively coupled to said fourth adder means and to said second output terminal of said comparing means for selecting said fourth sum as the alternative one of said absolute memory addresses to be accessed when said output terminal carries an enable signal; memory address translation means responsively coupled to said first gate means and said second gate means for accessing the memory location indicated by the selected one of said alternative absolute memory addresses.

5. Apparatus as in claim 4 and further including first timing control means for causing said first and second adder means to be operative at substantially a first instant in time for forming said first and second sums.

6. Apparatus as in claim 5 and further including second timing control means for causing said third and fourth adder means to be operative substantially at a second instant in time, said second instant being subsequent to said first instant in time, for forming said third and fourth sums.

7. Apparatus as in claim 6 wherein said first, second, third, fourth, and fifth adder means are operative to form their respective sums from the parallel input of the signals indicative of the specified operands to be added.

8. Apparatus as in claim 4 and further including apparatus for capturing a relative branch address comprising: a program instruction address register for providing the absolute address in memory of the next instruction to be executed; a flip-flop circuit responsively coupled to said first and second output terminals of said comparing means for indicating which of said first and second base relative address constants was added during the memory accessing operation in process; subtracter means coupled to said program instruction address register and to said first and second means for forming the difference of said program instruction address and the selected one of said first and second base relative constants, said selected one being determined by the enable signal on one of said output terminals; and means for storing said program relative branch address thus formed.

9. An electronic signal responsive apparatus operable in a sequence of program steps in combination including an addressable main memory device having a plurality of addressable storage locations for storing multidigit data and instruction word manifestation, each instruction word including a function code portion, an index register specifying field for controlling address modification, and a programmed relative memory address field; an instruction register for consecutively receiving and storing the respective instruction word manifestation; control means responsive to said function code portion for directing the operation in predetermined sequences; an arithmetic section for performing designated arithmetic operations on specified data words; at least one indexing register selectable by said index register specifying field; memory addressing means including an internal function register having at least a first portion for storing a first memory base address constant, a second portion for storing a second memory base address constant, and a third portion for storing a memory area divider pointer constant, first and second adder circuits for forming a first and second sums, first means for responsively coupling said first portion to said first adder circuit and second means for responsively coupling said second portion to said second adder circuit, third means for responsively coupling at least a part of said programmed relative address field to said first and second adder circuits, third and fourth adder circuits for forming third and fourth sums, each of said third and fourth sums respectively indicative of an alternative absolute address in said main memory, fourth means for responsively coupling said first adder circuit to said third adder circuit, fifth means for responsively coupling said second adder circuit to said fourth adder circuit, sixth means for responsively coupling the selected one of said index registers to said third and fourth adder circuits, a fifth adder circuit for forming a fifth sum coupled to said programmed relative memory address field and to the selected one of said index registers, comparing means having first and second output terminals and responsively coupled to said fifth adder circuit and to said third portion, said comparing circuit capable of providing an enable signal on said first output terminal when said fifth sum is greater than said stored memory area divider pointer constant and an enable signal on said second output terminal when said fifth sum is equal to or less than said stored memory area divider pointer constant, a first plurality of gate circuits coupled to said third adder circuit and to said first output terminal for selecting said third sum as the first alternative absolute memory address when said first output terminal is enabled, a second plurality of gate circuits coupled to said fourth adder circuit and said second output terminal for selecting said fourth sum as the second alternative absolute memory address when said second output terminal is enabled; and memory address translation means for accessing the location in said main memory according to the selected one of said first and second alternative absolute memory addresses.

10. Apparatus as in claim 9 wherein said third means includes a plurality of first level add gate circuits for receiving a timing pulse from said control means for timing the application of said program relative address field to said first and second adder circuits.

11. Apparatus as in claim 10 wherein said sixth means includes a plurality of second level add gates for receiving a control pulse from said control means for gating the contents of the selected one of said index registers to said third and fourth adder circuits.

12. Apparatus as in claim 11 and further including a storage limit register having a first portion for setting the upper limit of a first area in said memory, a second portion for storing a lower limit of said first area in said memory, a third portion for storing an upper limit of a second area in said memory, a fourth portion for storing a lower limit of said second area in said memory, first memory lockout means responsively coupled to said first and second portions in said storage limit register and to said first plurality of gate circuits for evaluating said first selected absolute memory address and prohibiting writing in said first area in said memory when said first absolute address falls within said first memory area upper and lower limits, and a second memory area lockout circuit responsively coupled to said second plurality of gate circuits and to said third and fourth portions of said storage limit register for prohibiting writing in said second area of said memory when said second absolute memory address falls within said upper and lower limits for said second memory area.

13. Memory addressing apparatus for use in an electronic computer having an addressable memory including a plurality of addressable memory registers and an instruction register having at least a portion thereof arranged for storing signals indicative of a base relative address of an absolute memory address to be accessed in said addressable memory, the base relative addressing apparatus comprising: first means for storing a first memory area base relative address constant; second means for storing a second memory area base relative address constant; third means for storing a memory area divider pointer constant; first adder means responsively coupled to said first means and to the base relative memory address portion of the instruction word for forming a first sum indicative of a first alternative absolute address; second adder means responsively coupled to said second means and to at least a portion of said base relative memory address portion of the instruction word for forming a second sum indicative of a second alternative absolute address; comparing means having a plurality of parallel input terminals and at least two output terminals; said comparing means responsively coupled to at least a portion of said base relative address portion of the instruction and to said third means for comparing said memory area divider pointer constant to at least a portion of said base relative address, said comparing circuit providing an enable pulse on a first of said output terminals when said memory area divider pointer constant has a first predetermined numerical relationship to at least said portion of said address and for providing an enable signal on a second of said output terminals when said memory area divider pointer constant has a second predetermined numerical relationship to said portion of said address; first gate means responsively coupled to said first output terminal of said comparing circuit for selecting said first sum as the absolute memory address when said first output terminal carries an enable signal; second gate means responsively coupled to said second output terminal of said comparing means for selecting said second sum as the alternate one of said absolute memory addresses when said output terminal carries an enable signal; memory address translation means responsively coupled to said first gate means and said second gate means for accessing the memory location indicated by the selected one of said alternative absolute memory addresses.

14. Apparatus as in claim 13 and further including in combination a storage limit register having a first portion for storing upper and lower memory address limit for a first area of said memory and a second portion for storing upper and lower address limits for a second area in said memory, said limits being programmably alterable, first memory lockout means coupled to said first gate means and said first portion of said storage limit register for prohibiting writing of information in an absolute address within the prohibited range of said first memory area, and second memory lockout means coupled to said second gate means and to said second portion of said storage limit register for prohibiting writing in an absolute address within the prohibited range of said second memory area.

15. Apparatus as in claim 13 and further including apparatus for capturing a relative branch address comprising: a program instruction address register for providing the absolute address of the next instruction to be executed; an indicating circuit responsively coupled to said comparing means for indicating which of said first and seoond base relative address constants was added during the memory accessing operation in process; subtracter means coupled to said program instruction address register and to said indicating means for forming the difference of said program instruction address and the selected one of said first and second base relative constants; and means for storing said program relative address thus formed.

16. An electronic signal responsive apparatus operable in a sequence of program steps in combination including an addressable main memory device having a plurality of addressable storage locations for storing multidigit data and instruction word manifestation, each instruction word including a function code portion, and a programmed relative memory address field; an instruction register for consecutively receiving and storing the respective instruction word manifestation; control means responsive to said function code portion for directing the operation in predetermined sequences; an arithmetic section for performing designated arithmetic operations on specified data words; memory addressing means including an internal function register having at least a first portion for storing a first memory base relative constant, a second portion for storing a second memory base address constant, and a third portion for storing a memory area divider pointer constant, first and second adder circuits for forming first and second sums, first means for responsively coupling said first portion of said first adder circuit and second means for responsively coupling said second portion to said second adder circuit, third means for responsively coupling at least a part of said programmed relative address field to said first and second adder circuits, first and second combining circuits for forming first and second operands, each of said first and second operands respectively indicative of an alternative absolute address in said main memory, fourth means for responsively coupling said first adder circuit to said first combining circuit, fifth means for responsively coupling said second adder circuit to said second combining circuit, sixth means for responsively coupling the remainder of said programmed relative address field to said first and second combining circuits; comparing means responsively coupling to said third portion and to said programmed relative address field and having first and second output terminals, said comparing circuit for providing an enable signal on said first output terminal when said relative address has a first predetermined relationship to said stored memory area divider pointer constant and an enable signal on said second output terminal when said relative address has a second predetermined relationship to said stored memory area divider pointer constant, a first plurality of gate circuits coupled to said first combining circuit and to said first output terminal for selecting said first operand as the first alternative absolute memory address when said first output terminal is enabled, a second plurality of gate circuits coupled to said second combining circuit and said second output terminal for selecting said second operand as the second alternative absolute memory address when said second output terminal is enabled; and memory address translation means for accessing the addressed location in said main memory according to the selected one of said first and second alternative absolute memory addresses.

17. An electronics signal responsive apparatus operable in a sequence of program steps in combination including an addressable main memory device having a plurality of addressable storage locations for storing multidigit data and instruction word manifestations, each instruction word including a function code portion and a programmed relative memory address field; an instruction register for consecutively receiving and storing the respective instruction word manifestations; control means responsively coupled to said instruction register and responsive to said function code portion for directing the operation in predetermined sequences; an arithmetic section for performing designated arithmetic operations on specified data words; memory addressing means including an internal function register having at least a first portion for storing a first memory base address constant, a second portion for storing a second memory base address constant, and a third portion for storing a memory area divider pointer constant, a first full adder circuit responsively coupled to said first portion and to at least a portion of said programmed relative memory address field for forming a first sum indicative of one of two alternative absolute memory addresses, a second full adder circuit responsively coupled to said second portion and to at least a portion of said programmed relative memory address field for forming a second sum indicative of the other of two alternative absolute memory addresses, comparing means responsively coupled to said third portion of said internal function register and to at least a portion of said programmed relative address field, said comparing circuit having first and second output terminals for providing an enable signal on said first output terminal when said portion of the base relative address value has a first predetermined numerical relationship to said stored memory area divider pointer constant and an enable signal on said second output terminal when said portion of the base relative address value has a second predetermined numerical relationship to said stored memory area divider pointer constant, first selection circuits coupled to said first full adder circuit and to said first output terminal for selecting said first sum as the first alternative absolute memory address when said first output terminal is enabled, second selection circuits coupled to said second full adder circuit and said second output terminal for selecting said second sum as the second alternative absolute memory address when said second output terminal is enabled; and memory address translation means coupled to said first and second plurality of gate circuits for accessing the location in said main memory according to the selected one of said first and second alternative absolute memory addresses.

18. An electronics signal responsive apparatus operable in the sequence of program steps in combination including an addressable main memory device having a plurality of addressable storage locations for storing multidigit data and instruction word manifestation, each instruction word including a function code portion, an index register specifying field for controlling address modification, and a programmed relative memory address field; an instruction register for consecutively receiving and storing the respective instruction word manifestations; control means responsively coupled to said instruction register and responsive to said function code portion for directing the operation in predetermined sequences; an arithmetic section for performing designated arithmetic operations on specified data words; at least one indexing register selectable by said index registers specifying field; memory addressing means including an internal function register having at least a first portion for storing a first memory base address constant, a second portion for storing a second memory base address constant, and a third portion for storing a memory divider pointer constant, a first full adder circuit responsively coupled to said first portion and to at least a portion of said programmed relative memory address field for forming a first sum, a second full adder circuit responsively coupled to said second portion and to at least a portion of said programmed relative memory address field for forming a second sum, a third full adder circuit coupled to said first full adder circuit and the remainder of said programmed relative memory address field and to the selected one of said index registers for forming a third sum, said third sum representing one of two alternative absolute memory addresses, a fourth full adder circuit coupled to said second full adder circuit and the remainder of said programmed relative address field and to the selected one of said index registers for forming a fourth sum, said fourth sum representing the second of said two alternative absolute memory addresses, a fifth full adder circuit responsively coupled to said relative memory address field of said instruction register and said selected one of said index register for forming a fifth sum, comparing means responsively coupled to said third portion of said internal function register and to at least a portion of said fifth full adder circuit, said comparing circuit having first and second output terminals for providing an enable signals on said first output terminal when said portion of said fifth sum is greater than said stored memory area divider pointer constant and an enable signal on said second output terminal when said portion of said fifth sum is equal or less than said stored memory area divider pointer constant, a first plurality of gate circuits coupled to said third full adder circuit and to said first output terminal for selecting said third sum as the first alternative absolute memory address when said first output terminal is enabled, a second plurality of gate circuits coupled to said fourth full adder circuit and said second output terminal for selecting said fourth sum as the second alternative absolute memory address when said second output terminal is enabled; and memory address translation means coupled to said first and second plurality of gate circuits for accessing the location in said main memory according to the selected one of said first and second alternative absolute memory addresses.

19. Apparatus as in claim 18 and further including a storage limit register having a first portion for setting the upper address limit for a first area in said memory, a second portion for storing a lower address limit for said first area in said memory, a third portion for storing an upper address limit for a second area in said memory, a fourth portion for storing a lower address limit for said second area in said memory, first memory lockout means responsively coupled to said first and second portions of said storage register and to said first plurality of gate circuits for evaluating said first selected absolute memory address and prohibiting writing in said first area in said memory when said first absolute address is selected and falls within said first memory area upper and lower limits, and a second memory area lockout circuit responsively coupled to said plurality of gate circuits and to third and fourth portions of said storage limit register for prohibiting writing in said second area of said memory when said second absolute address is selected and falls within said upper and lower address limits for said second area.

20. Memory addressing control apparatus for use with an addressable memory having a plurality of independently addressable storage registers for storing data and instruction word manifestations and having an instruction storage register with at least a portion thereof adapted for storing a base relative memory address to be accessed in the memory section, said base relative addressing system comprising: receiving means for receiving signal manifestations indicative of a programmed relative address; storing means for storing at least two selectively alterable base relative addresses and memory divider control signals; means coupled to said receiving means and said storing means for substantially simultaneously forming a pair of alternative memory addresses; and address selection control means for selecting the one of said pair of alternative memory addresses to be used to access the memory in response to said memory divider control signals.

References Cited

UNITED STATES PATENTS

| | | | |
|---|---|---|---|
| 3,036,773 | 5/1962 | Brown | 235—157 |
| 3,222,649 | 12/1965 | King et al. | 340—172.5 |
| 3,315,233 | 4/1967 | Campo et al. | 340—172.5 |
| 3,317,898 | 5/1967 | Hellerman | 340—172.5 |

ROBERT C. BAILEY, *Primary Examiner.*

I. S. KAVRUKOV, *Assistant Examiner.*